United States Patent
Ghorbani et al.

(10) Patent No.: US 8,549,497 B2
(45) Date of Patent: Oct. 1, 2013

(54) HIGH-LEVEL HYPERMEDIA SYNTHESIS FOR ADAPTIVE WEB

(75) Inventors: Ali-Akbar Ghorbani, Fredericton (CA); Mehran Nadjarbashi-Noghani, Coquitlam (CA); Seyed-Hossein Sadat-Kooch-Mohtasham, Vancouver (CA)

(73) Assignee: University of New Brunswick, Fredericton, New Brunswick (CA)

( * ) Notice: Subject to any disclaimer, the term of this patent is extended or adjusted under 35 U.S.C. 154(b) by 1185 days.

(21) Appl. No.: 12/115,137

(22) Filed: May 5, 2008

(65) Prior Publication Data

US 2009/0276764 A1 Nov. 5, 2009

(51) Int. Cl.
G06F 9/45 (2006.01)
G06F 17/28 (2006.01)

(52) U.S. Cl.
USPC ........... 717/148; 717/137; 717/146; 717/147; 715/234

(58) Field of Classification Search
None
See application file for complete search history.

(56) References Cited

U.S. PATENT DOCUMENTS

| | | | | |
|---|---|---|---|---|
| 5,966,535 | A * | 10/1999 | Benedikt et al. | 717/147 |
| 7,197,702 | B2 * | 3/2007 | Niyogi et al. | 715/234 |
| 7,644,400 | B2 * | 1/2010 | Harris et al. | 717/136 |
| 7,844,958 | B2 * | 11/2010 | Colton et al. | 717/146 |
| 7,966,408 | B2 * | 6/2011 | Schramm et al. | 709/228 |
| 2003/0023755 | A1 * | 1/2003 | Harris et al. | 709/246 |
| 2003/0070161 | A1 * | 4/2003 | Wong et al. | 717/148 |
| 2006/0031749 | A1 * | 2/2006 | Schramm et al. | 715/500.1 |
| 2008/0115119 | A1 * | 5/2008 | Lagergren | 717/148 |
| 2008/0216060 | A1 * | 9/2008 | Vargas | 717/137 |
| 2009/0089767 | A1 * | 4/2009 | Daynes et al. | 717/148 |

OTHER PUBLICATIONS

Sadat, S., et al., A Language for High-Level Description of Adaptive Web Systems, Elsevier Science preprint, Feb. 3, 2006, 40 pages, [retrieved on Jun. 26, 2013], Retrieved from the Internet: <URL:http://www.cs.unb.ca/tech-reports/documents/TR06_175.pdf>.*
Antonio, J., et al., Adaptive Hypermedia Presentation Modeling for Domain Ontologies, Proceedings of 10th International Conference on Human-Computer Interaction, 2001, 5 pages, [retrieved on Jun. 26, 2013], Retrieved from the Internet: <URL: http://citeseerx.ist.psu.edu/viewdoc/summary?doi=10.1.1.58.6542>.*
Frank Manola and Eric miller, eds., RDF primer, 2004, W3C, available at: http://www.w3.org/TR/rdf-primer/.
M. Joshi and V. Kumar, Tutorial on High Performance Data Mining, Fifth International Conference of High Performance Computing, 1998, Chennai, India.
R. Agrawal and R. Srikant, Fast Algorithms for Mining Association Rules, Proceedings of the 20th International Conference of Very Large Databases, 1994, pp. 487-499, Santiago, Chile.
Resource Description Framework Specification, http://www.w3.org/RDF/, W3C, 2004.

(Continued)

Primary Examiner — Thuy Dao
Assistant Examiner — Geoffrey St Leger
(74) Attorney, Agent, or Firm — Eugene F. Derényi; Fogler, Rubinoff LLP

(57) ABSTRACT

A process for dynamically generating browser-ready code from a high-level code description of a web page written in a first predefined language having one or more adaptive features and from one or more constraints associated with a request for such browser-ready code.

6 Claims, 23 Drawing Sheets

Big Picture of the System

(56) References Cited

OTHER PUBLICATIONS

M. Kilfoil, A. Ghorbani, W. Xing, Z. Lei, J. Lu, J. Zhang and X. Xu , "Toward an Adaptive Web: The State of the Art and Science", Proceedings of the 1st Annual Conference on Communication Networks & Services Research (CNSR 2003), pp. 119-130, May 15-16, 2003 Moncton, Canada.

Hossein Sadat and Ali A. Ghorbani, "Automated Web Page Synthesis in Adaptive Web Systems", Business Agents and the Semantic Web Workshop (BASeWEB'04), May 2004, London, ON, Canada.

S. Hossein Sadat-Kouch-Mohtasham and Ali A. Ghorbani, "A Presentation Specification Language for Adaptive Web Systems", Proc. of the 3rd Annual Conference on Communication Networks & Services Research (CNSR 2005), pp. 169-175, May 16-18, 2005, Halifax, Canada.

HP Labs Semantic Web Research, http://www.hpl.hp.com/semweb/, HP Labs. Accessed 2003.

Extensible Markup Language Specification, http://www.w3.org/XML,W3C 1996-2003.

Scaleable Vector Graphics Specification, http://.w3.org/graphics/SVG/, W3C 2008.

XHTML2 Specification, http://www.w3.org/MarkUp/,W3C-Jul. 22, 2004.

Hossein Sadat and Ali A. Ghorbani, "Automated Web Page Synthesis in AdaptiveWeb System", Proc. of the Workshop on Business Agents and the Semantic Web (BASeWEB'04), in conjunction with the 17th Conference of the Canadian Society for Computational Studies of the Intelligence (AI 2004), pp. 73-84, May 16, 2004, London, ON, Canada.

Mehran Nadjarbashi-Noghani, S. Hossein Sadat K. M., Jie Zhang and Ali Ghorbani, "PENS: A Personalized Electronic News Systems", Proc. of the 3rd Annual Conference on Communication Networks & Services Research (CNSR 2005), pp. 31-38, May 16-18, 2005, Halifax, Canada.

Hossein Sadat and Ali A. Ghorbani, "On the evaluation of adaptive web systems", Proc. of the The Second International Workshop on Web-based Support Systems (WSS'04), in conjunction with 2004 IEEE/WIC/ACM conference on Web Intelligence, pp. 127-136, Sep. 20, 2004, Beijing, China.

M. Kilfoil, A. Ghorbani, W. Xing, Z. Lei, J. Lu, J. Zhang and X. Xu , "Toward an Adaptive Web: The State of the Art and Science," Proceedings of the 1st Annual Conference on Communication Networks & Services Research (CNSR 2003), pp. 119-130, May 15-16, 2003 Moncton, Canada.

Mark Kilfoil, Wenpu Xing and Ali Ghorbani, "ARAS: Adaptive Recommender for Academic Schedulin", Proc. of the 3rd Annual Conference on Communication Networks & Services Research (CNSR 2005), pp. 307-312, May 16-18, 2005, Halifax, Canada.

Wenpu Xing and Ali A. Ghorbani, Information Domain Modeling for Adaptive Web Systems, Proc. of the 2005 IEEE/WIC/ACM International Conference on Web Intelligence, Sep. 19-22, 2005, Compiegne, France.

\* cited by examiner

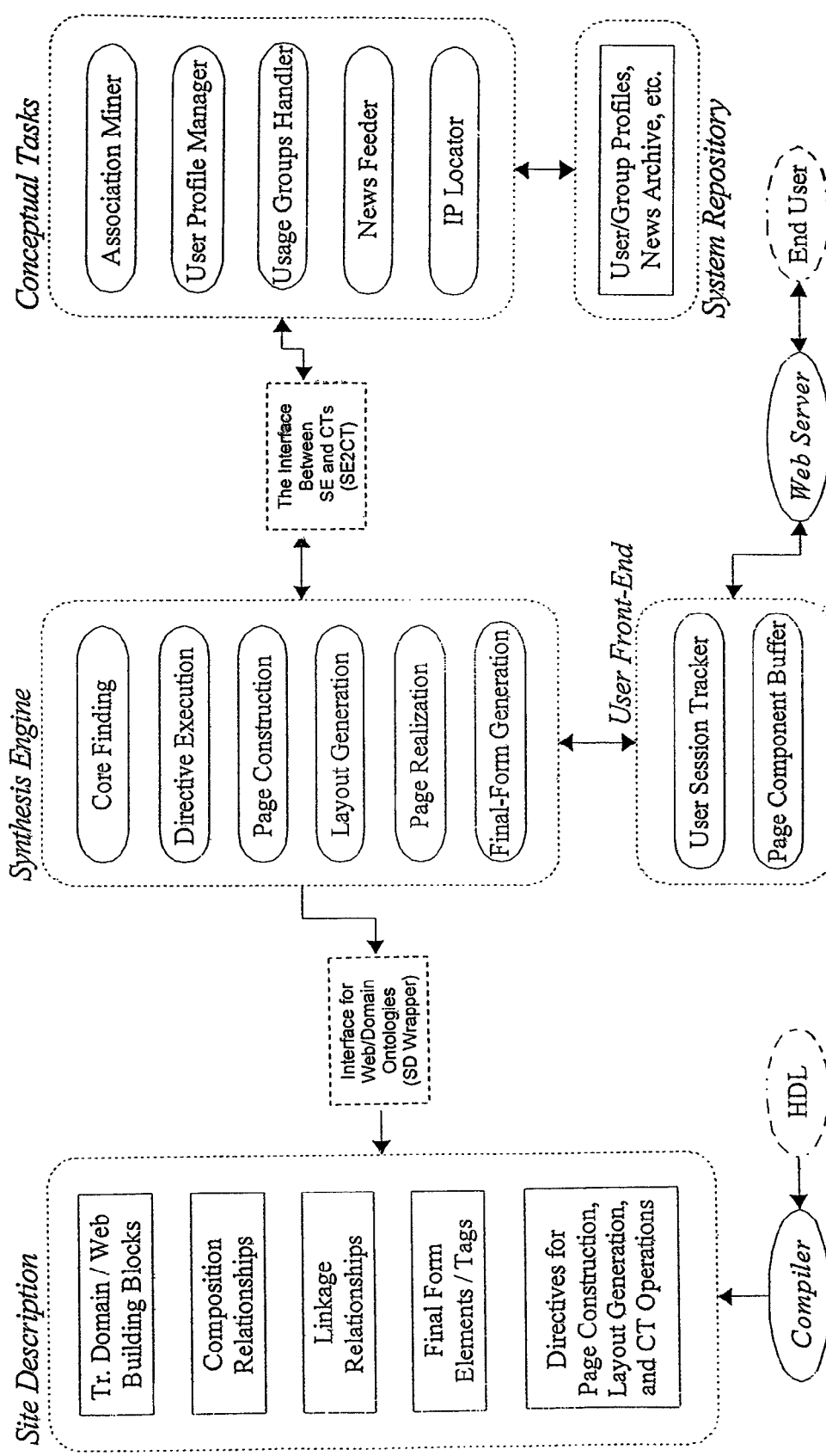
Figure 1 - Big Picture of the System

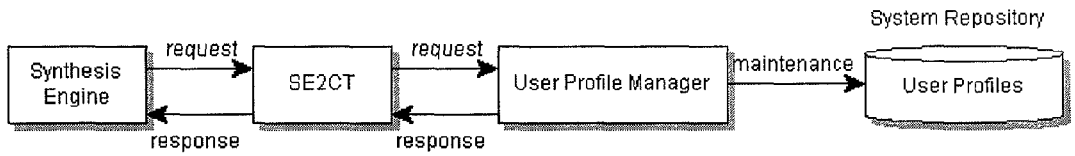

Figure 2 - Communication between UPM and SE2CT

```
<rdfs:Description rdf:ID="UserModel">
  <rdf:type rdf:resource="http://www.w3.org/2000/01/rdf-schema#Class" />
  <rdfs:comment>User Model is a collection of properties about user</rdfs:comment>
</rdfs:Description>
...
<rdf:Property rdf:ID="dgmodel">
  <rdfs:domain rdf:resource="#UserModel" />
  <rdfs:range rdf:resource="#DGModel" />
  <rdfs:comment>demographic information about the user</rdfs:comment>
</rdf:Property>
...
<rdfs:Class rdf:ID="DGModel">
  <rdfs:comment>Model that represents demographic information about user</rdfs:comment>
</rdfs:Class>
...
<rdf:Property rdf:ID="age">
  <rdfs:domain rdf:resource="#DGModel" />
  <rdfs:comment>User's age is represented by a interger number</rdfs:comment>
  <rdfs:range rdf:resource="&xsi;integer" />
</rdf:Property>

<rdf:Property rdf:ID="gender">
  <rdfs:domain rdf:resource="#DGModel" />
  <rdfs:comment>User's gender is represented by either "male" or "female".</rdfs:comment>
  <rdfs:range>
        <rdf:Alt>
              <rdf:li>male</rdf:li>
              <rdf:li>female</rdf:li>
        </rdf:Alt>
  </rdfs:range>
</rdf:Property>
...
```

Figure 3 - User model vocabulary for E-news domain

```
<rdfs:Class rdf:ID="InterestedTopics">
 <rdfs:comment>indicates how users are interested in predefined topics</rdfs:comment>
</rdfs:Class>

<rdf:Property rdf:ID="NATIONAL">
 <rdfs:domain rdf:resource="#InterestedTopics" />
 <rdfs:comment>User's interests in national news.</rdfs:comment>
 <rdfs:range rdf:parseType="Literal" />
</rdf:Property>

<rdf:Property rdf:ID="WORLD">
 <rdfs:domain rdf:resource="#InterestedTopics" />
 <rdfs:comment>User's interests in world news.</rdfs:comment>
 <rdfs:range rdf:parseType="Literal" />
</rdf:Property>
...
```

Figure 4 - Interested topics class in user model vocabulary

```
<umdv:UserModel rdf:ID = "defaultUserProfile">
        <umdv:dgInfor rdf:resource = "#dgInfor"/>
        <umdv:interestedTopics rdf:resource = "#interestedTopics"/>
...
</umdv:UserModel>
...
<umdv:DGModel rdf:ID = "dgInfor">
        <umdv:age>28</umdv:age>
        <umdv:gender>male</umdv:gender>
        <umdv:educationLevel>bechalor</umdv:educationLevel>
        <umdv:educationField>Computer Science</umdv:educationField>
...
</umdv:DGModel>
<umdv:InterestedTopics rdf:ID = "interestedTopics">
        <umdv:FINANCIAL>0</umdv:FINANCIAL>
        <umdv:ACADEMIC>0</umdv:ACADEMIC>
...
</umdv:InterestedTopics>
...
```

Figure 5 - Description of user model

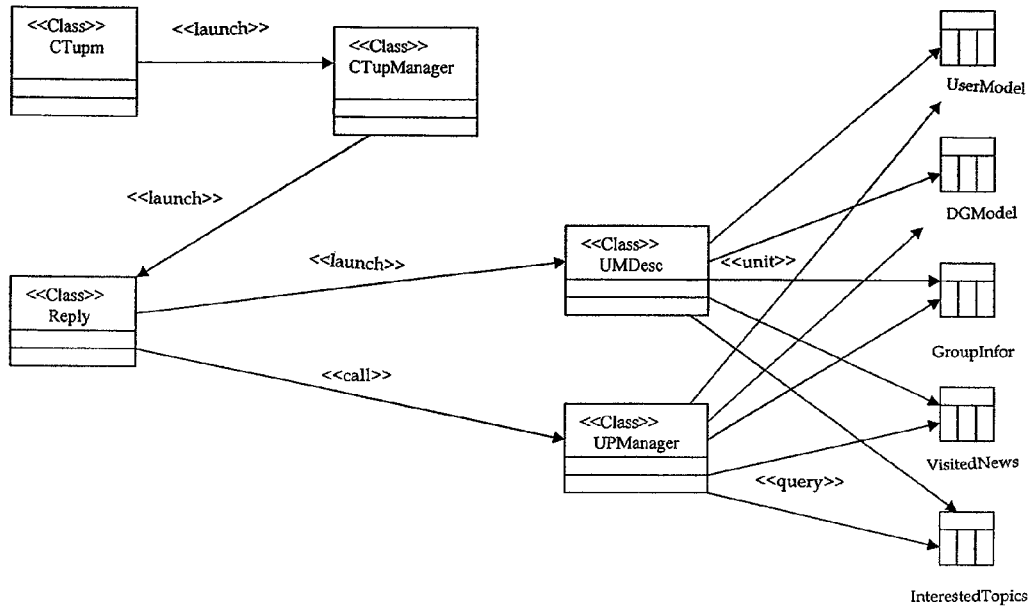
Figure 6 - Class diagram for UPM
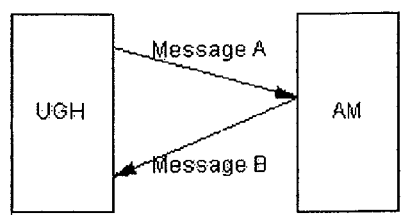
Figure 7 - Communications between UGH and AM
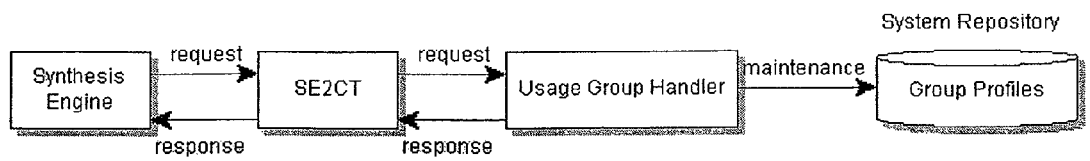
Figure 8 - Communication between UGH and SE2CT

```
<rdfs:Description rdf:ID="GroupModel">
  <rdf:type rdf:resource="http://www.w3.org/2000/01/rdf-schema#Class" />
  <rdfs:comment>Group Model is a collection of properties about a group of users</rdfs:comment>
</rdfs:Description>

<rdf:Property rdf:ID="groupID">
  <rdfs:domain rdf:resource="#GroupModel" />
  <rdfs:comment>GroupID uniquely identifies each group by a number.</rdfs:comment>
  <rdfs:range rdf:resource="&xsi;integer" />
</rdf:Property>

<rdf:Property rdf:ID="academic">
  <rdfs:domain rdf:resource="#GroupModel" />
  <rdfs:comment>Interest value of academic category is a float number</rdfs:comment>
  <rdfs:range rdf:parseType="Literal" />
</rdf:Property>
...
```

Figure 9 - Group model vocabulary for E-news domain

```
<gmdv:GroupModel rdf:ID = "defaultGroupProfile">
        <gmdv:groupID>-1</gmdv:groupID>
        <gmdv:groupPopu>0</gmdv:groupPopu>
        <gmdv:newPopu>0.0</gmdv:newPopu>
        <gmdv:financial>0.0</gmdv:financial>
        <gmdv:academic>0.0</gmdv:academic>
        <gmdv:social>0.0</gmdv:social>
        <gmdv:people>0.0</gmdv:people>
        <gmdv:misc>0.0</gmdv:misc>
</gmdv:GroupModel>
```

Figure 10 - Description of group model

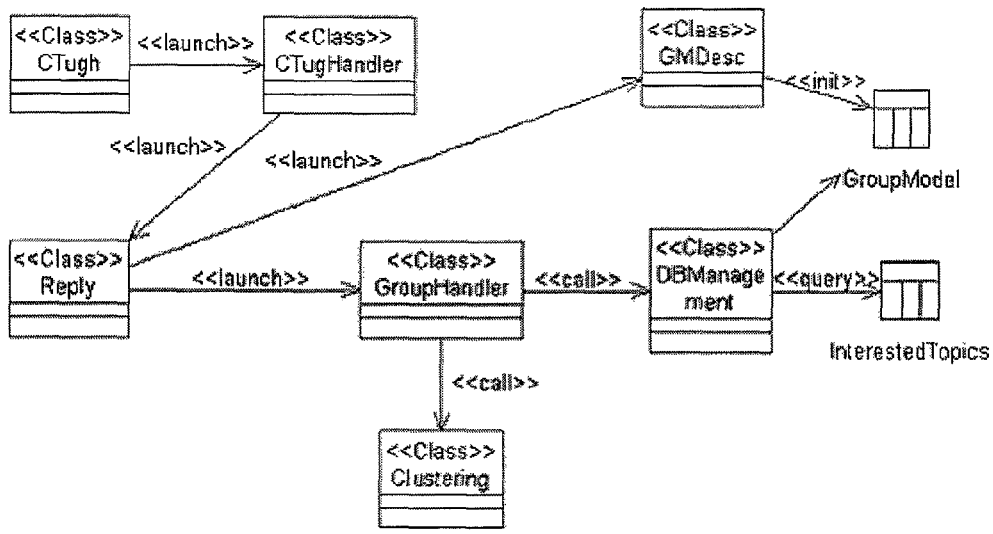
Figure 11 - Class diagram for UGH
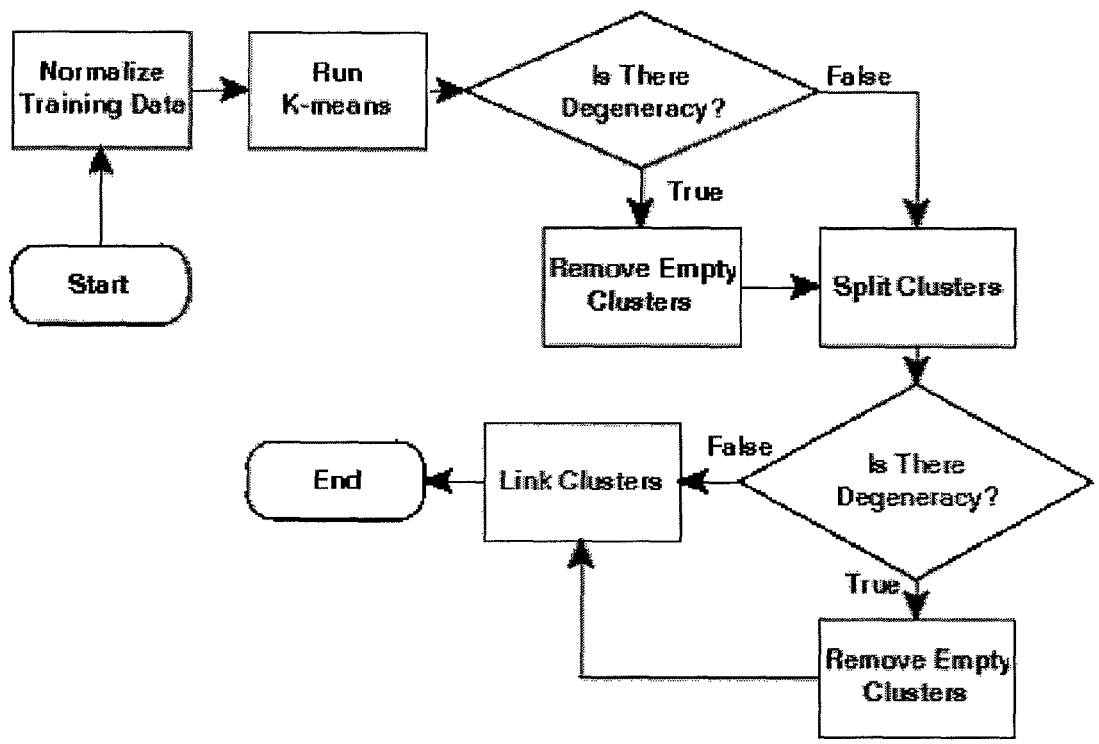
Figure 12 - K-means+ algorithm

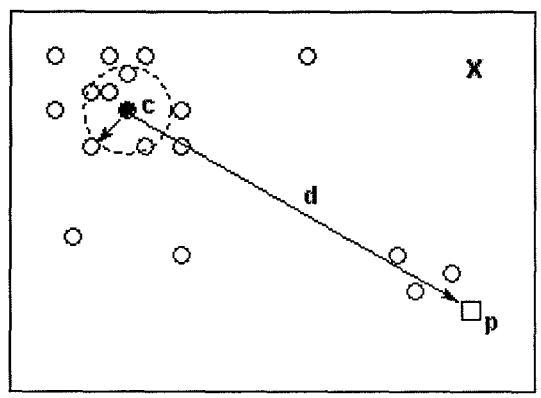
Figure 13 - Clusters before splitting
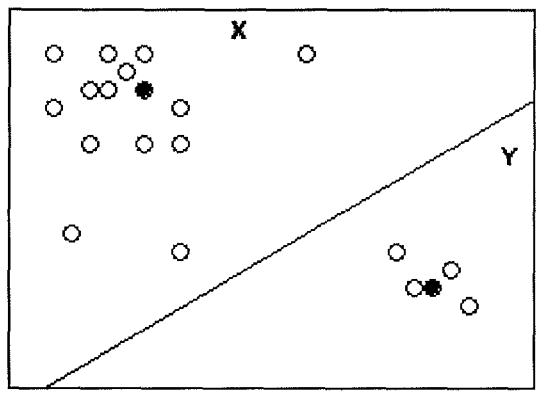
Figure 14 - Clusters after splitting

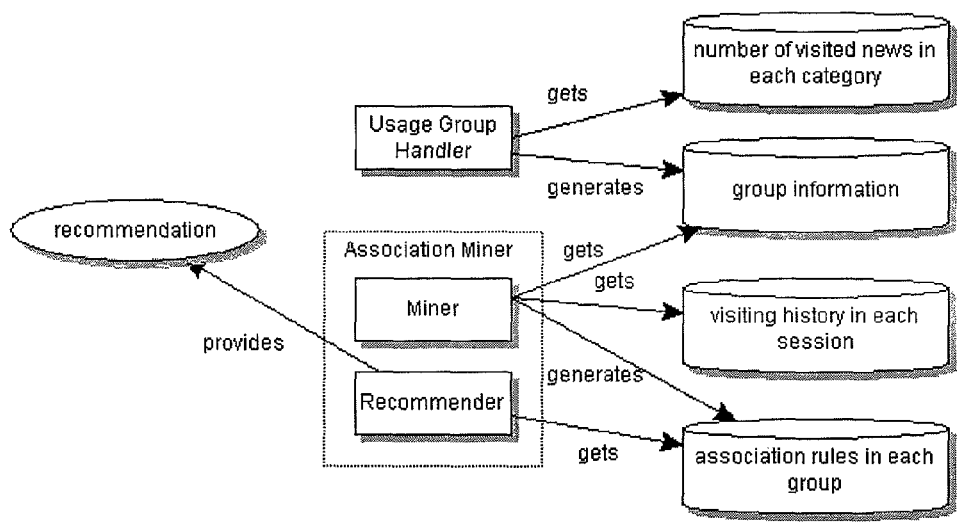
Figure 15 - Cooperation between UGH and AM
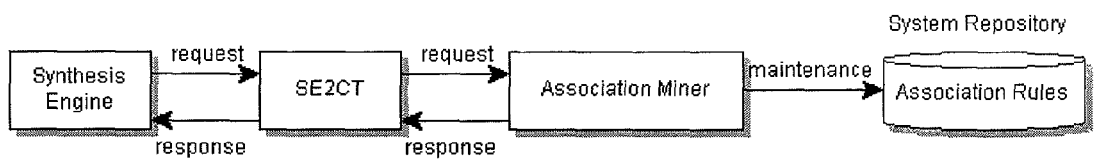
Figure 16 - Communication between AM and SE2CT

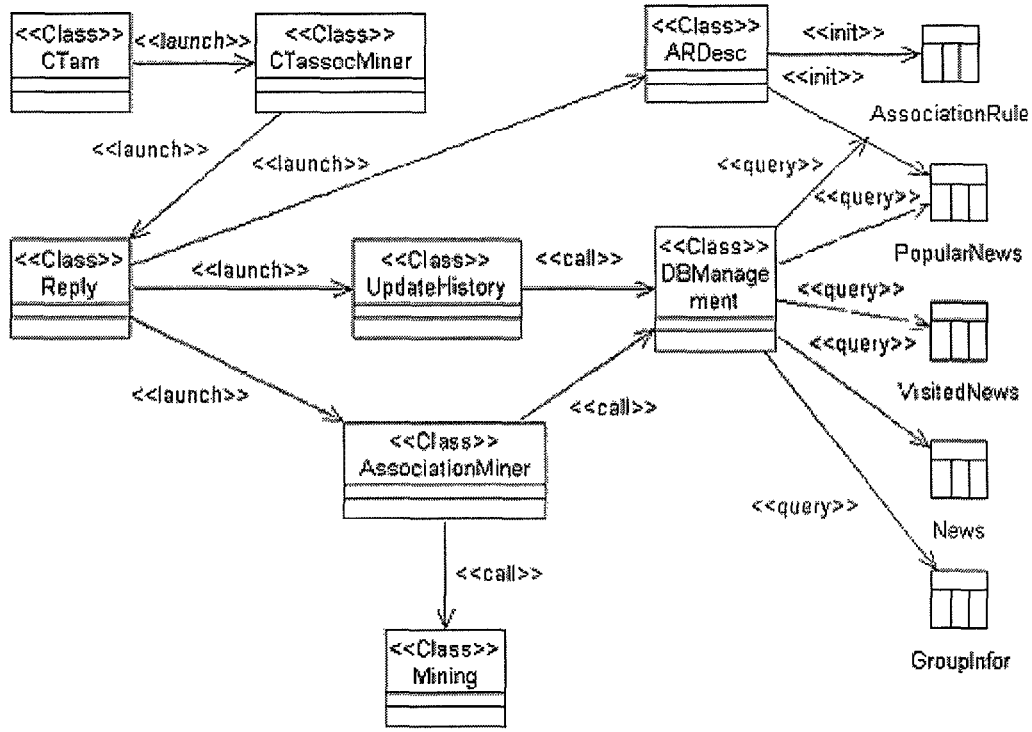
Figure 17 - Class diagram for AM
$F_1$ = {frequent 1-item sets};
k = 2;
while( $F_{k-1}$ is not empty ) {
        $C_k$ = Apriori_generate( $F_{k-1}$ );
        for all transactions t in T {
                Subset( $C_k$, t );
        }
        $F_k$ = { c in $C_k$ s.t. c.count >= minimum_support};
}
Answer = union of all sets $F_k$;
(© 1999, Univ. of Minnesota     High Performance Data Mining (Vipin Kumar and Mahesh Joshi)
Figure 18 - Apriori algorithm

```
Apriori_generate( F(k-1) ) {
        join F_{k-1} with F_{k-1} such that,
            c_1 = (i_1, i_2, .. , i_{k-1}) and c_2 = (j_1, j_2, .. , j_{k-1}) join together if
                i_p = j_p for 1 <= p < k-1,
        and then new candidate, c, has a form
            c = (i_1,i_2,...,i_{k-1}, j_{k-1}).
            c is then added to a hash-tree structure.
}
```

(© 1999, Univ. of Minnesota    High Performance Data Mining (Vipin Kumar and Mahesh Joshi)

Figure 19 – Apriori-generate procedure

```
//Faster Algorithm
1) forall large k-itemsets l_k, k ≥ 2 do begin
2)   H_1 = {consequents of rules derived from l_k with one item in the consequent};
3)   call ap-genrules(l_k, H_1);
4) end 5) procedure ap-genrules(l_k: large k-itemsets; H_m: set of m-item consequents)
6)   if (k > m + 1) then begin
7)     H_{m+1} = apriori-gen(H_m)
8)     forall h_{m+1} ∈ H_{m+1} do begin
9)       conf = support(l_k)/support(l_k - h_{m+1});
10)      if (conf ≥ minconf) then
11)        output the rule (l_k - h_{m+1}) ⟹ h_{m} with confidence = conf and
12)                                        support = support(l_k);
13)      else
14)        delete h_{m+1} from H_{m+1};
15)    end
16)  end
17)  call ap-genrules(l_k, H_{m+1});
18) end
```

Figure 20 - Algorithm of generating association rules

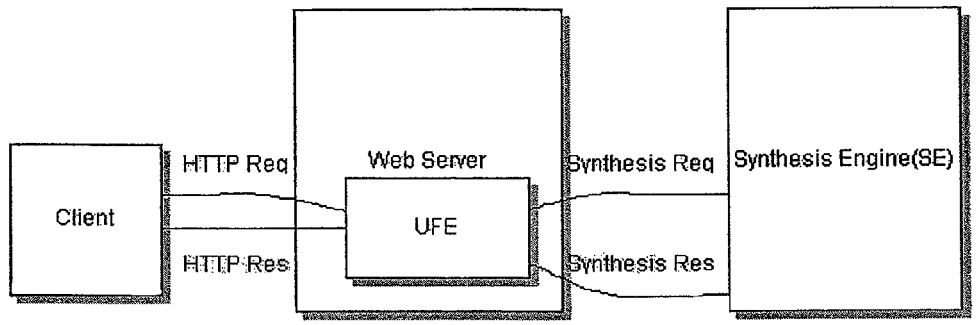

Figure 21 - The high-level architecture of the system

| Hardware Platform<br>• Color capability<br>• Screen size<br>• Number of soft keys<br>• Pixel aspect ratio<br>• Sound capability<br>• Etc. | Software Platform<br>• Operating system<br>• SW download capability<br>• Content types<br>• Character sets<br>• Etc. | Network Characteristics<br>• Session bearer<br>• Available bearers<br>• Available security and Encryption mechanisms<br>• Etc. |
|---|---|---|
| Browser UA<br>• Browser name<br>• XHTML version<br>• XHTML modules<br>• Frame and table support<br>• JavaScript™ support<br>• Etc. | WapCharacteristics<br>• Deck size<br>• WML version<br>• WMLScript libraries<br>• WTAI libraries<br>• OMA download<br>• Etc. | Push Characteristics<br>• Push content types<br>• Push application types<br>• Push character sets<br>• Push message size<br>• Etc. |

Figure 22 - Information found in a UAProf

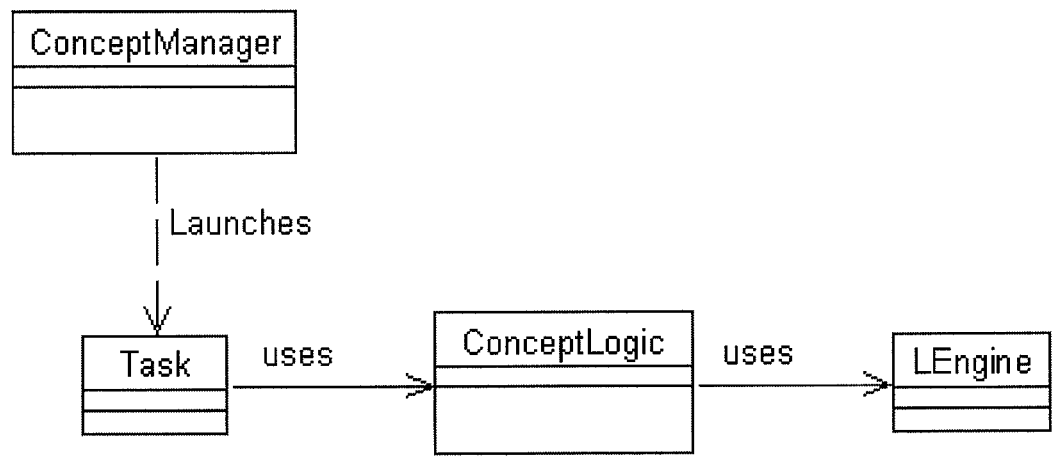
Figure 23 - Interaction between CM classes
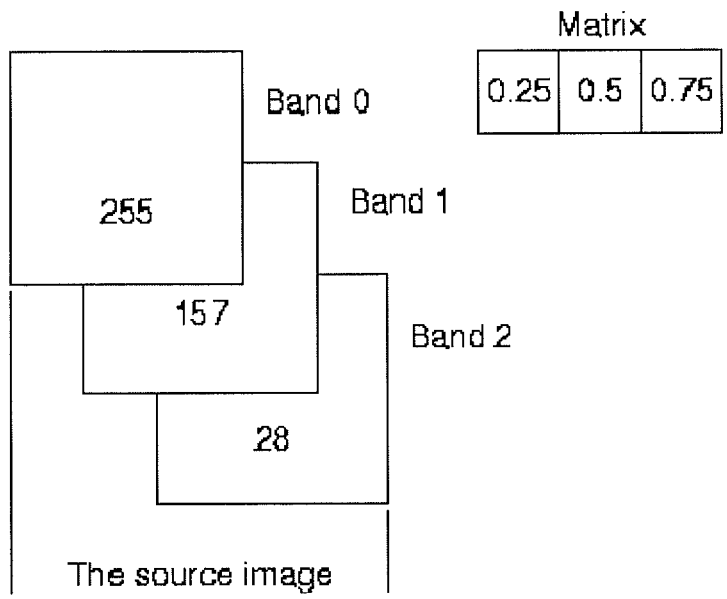
Figure 24 - Color conversion

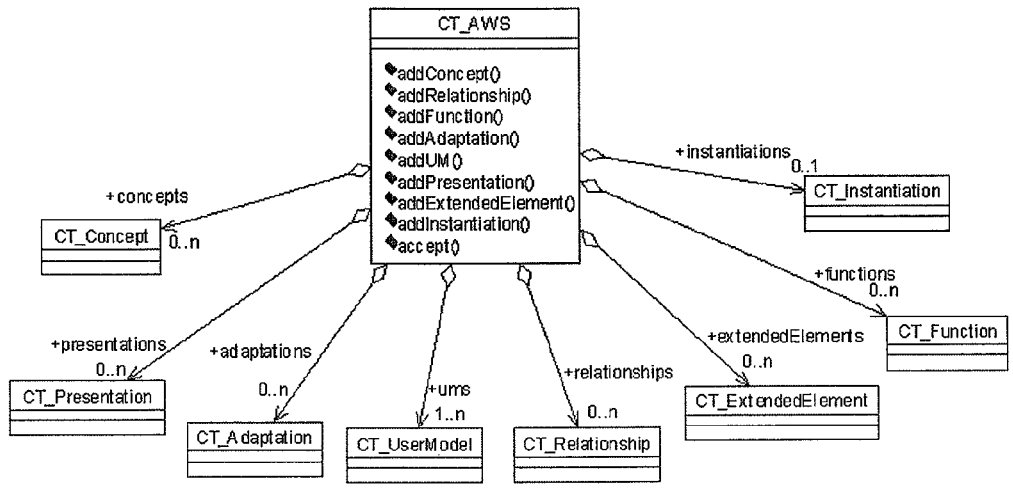
Figure 25 - The hierarchy of a parsed AWL program
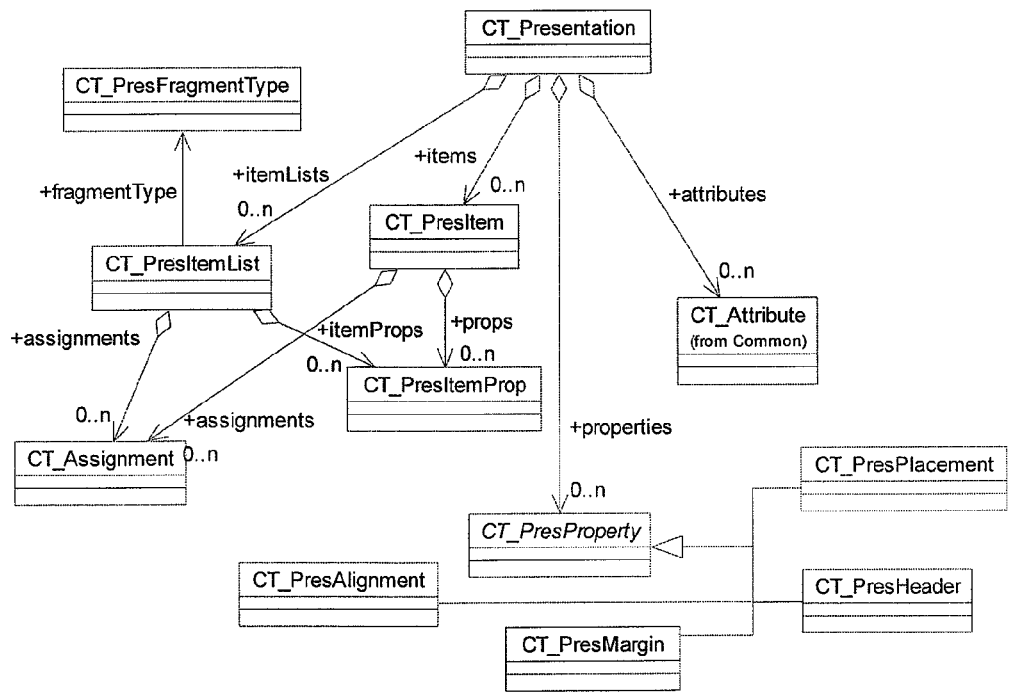
Figure 26 - Presentation-related semantic objects

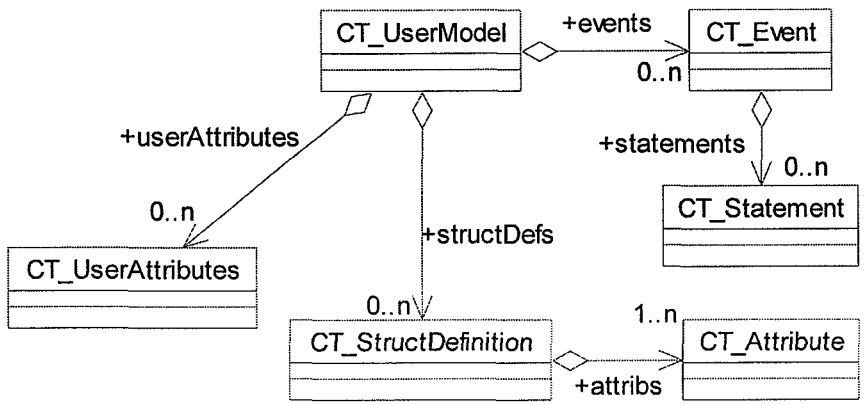
Figure 27 - User model class hierarchy
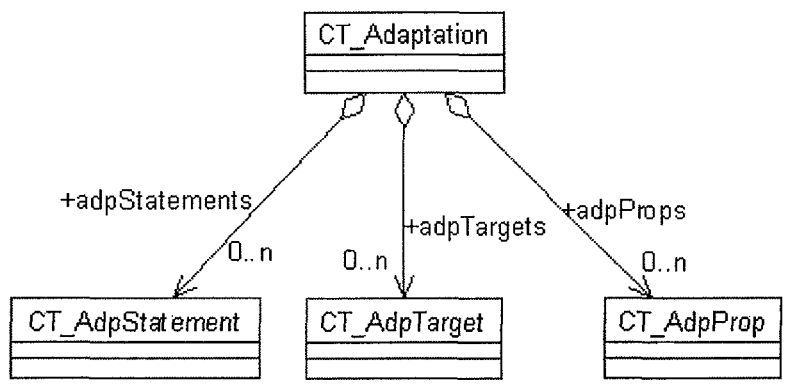
Figure 28 - The adaptation classes
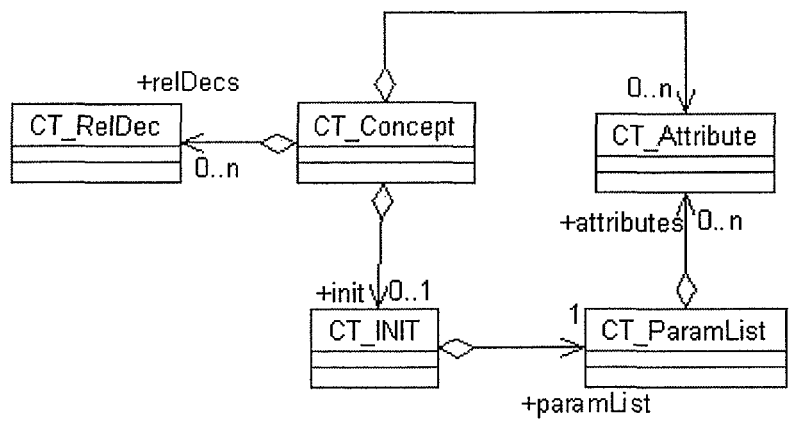
Figure 29 - Concept class hierarchy

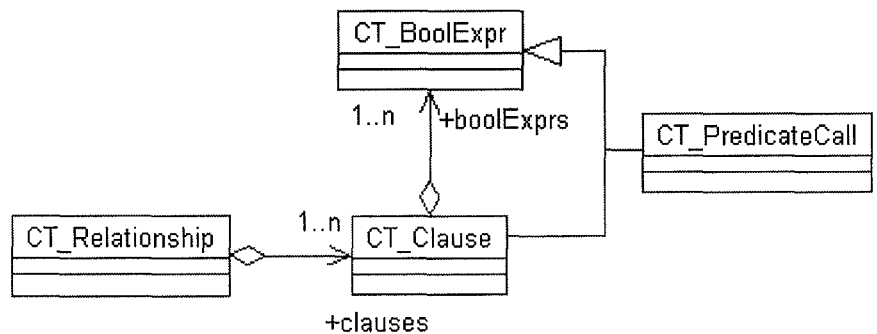
Figure 30 - Relationship class hierarchy
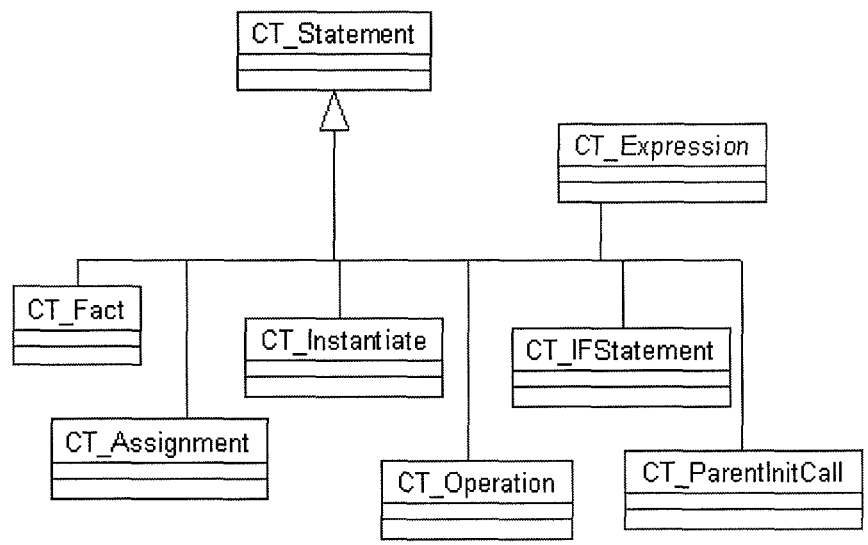
Figure 31 - Statement class hierarchy

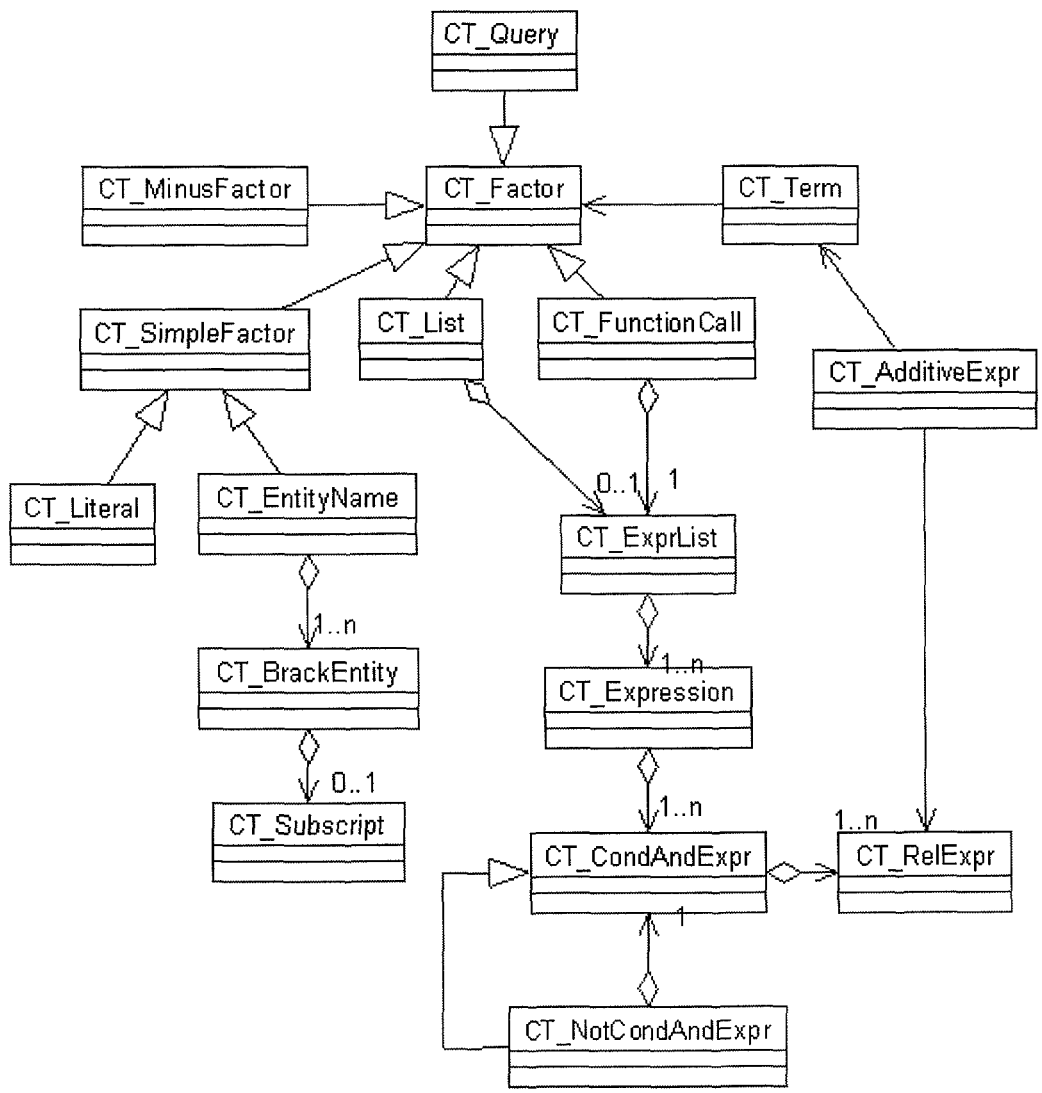
Figure 32 - Expression class hierarchy

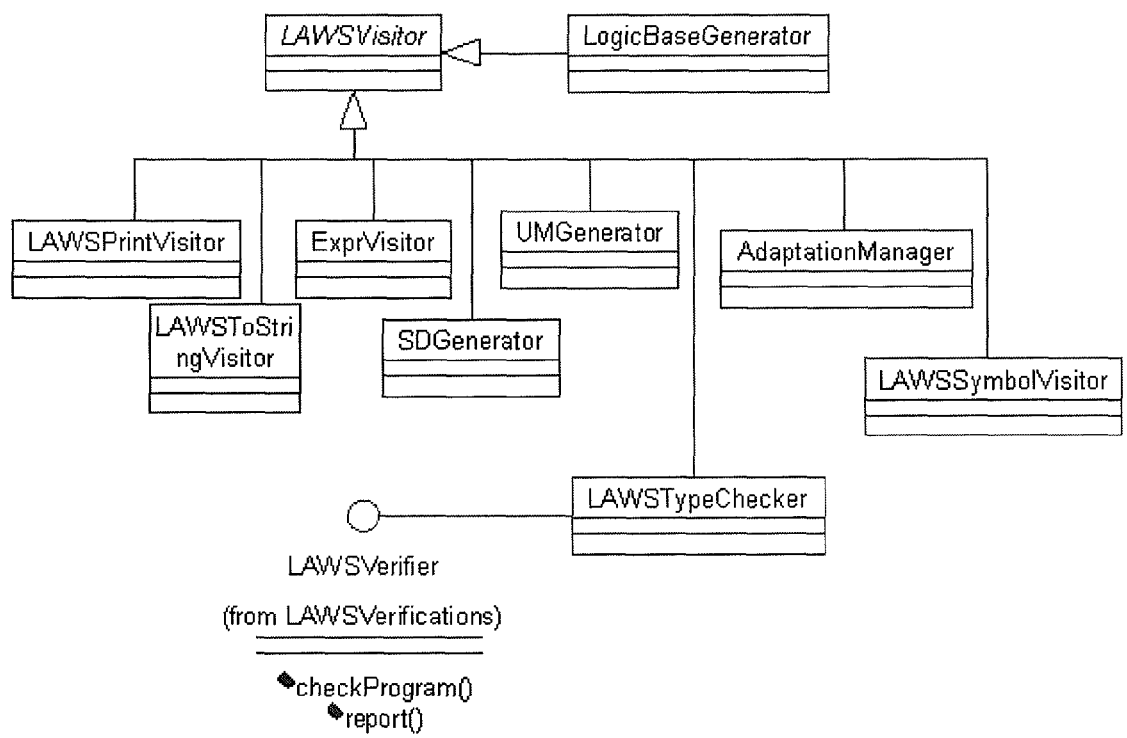
Figure 33 - Most of the AWL Compiler components are designed as visitors

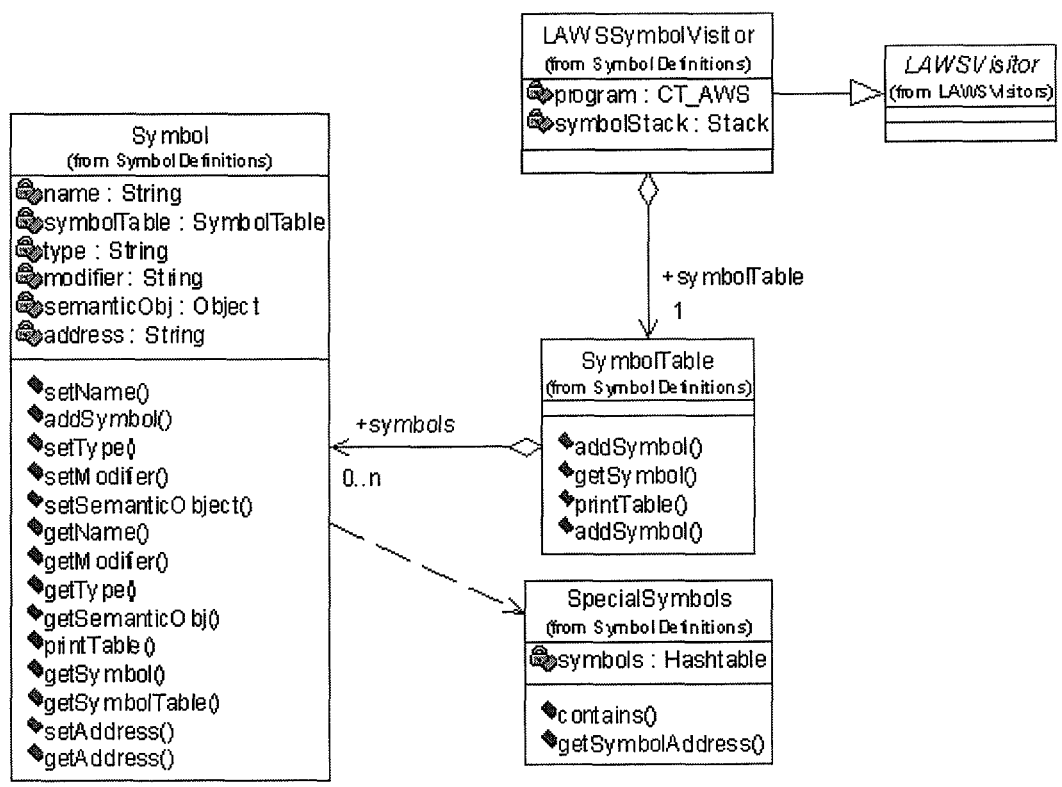
Figure 34 - Symbol table classes

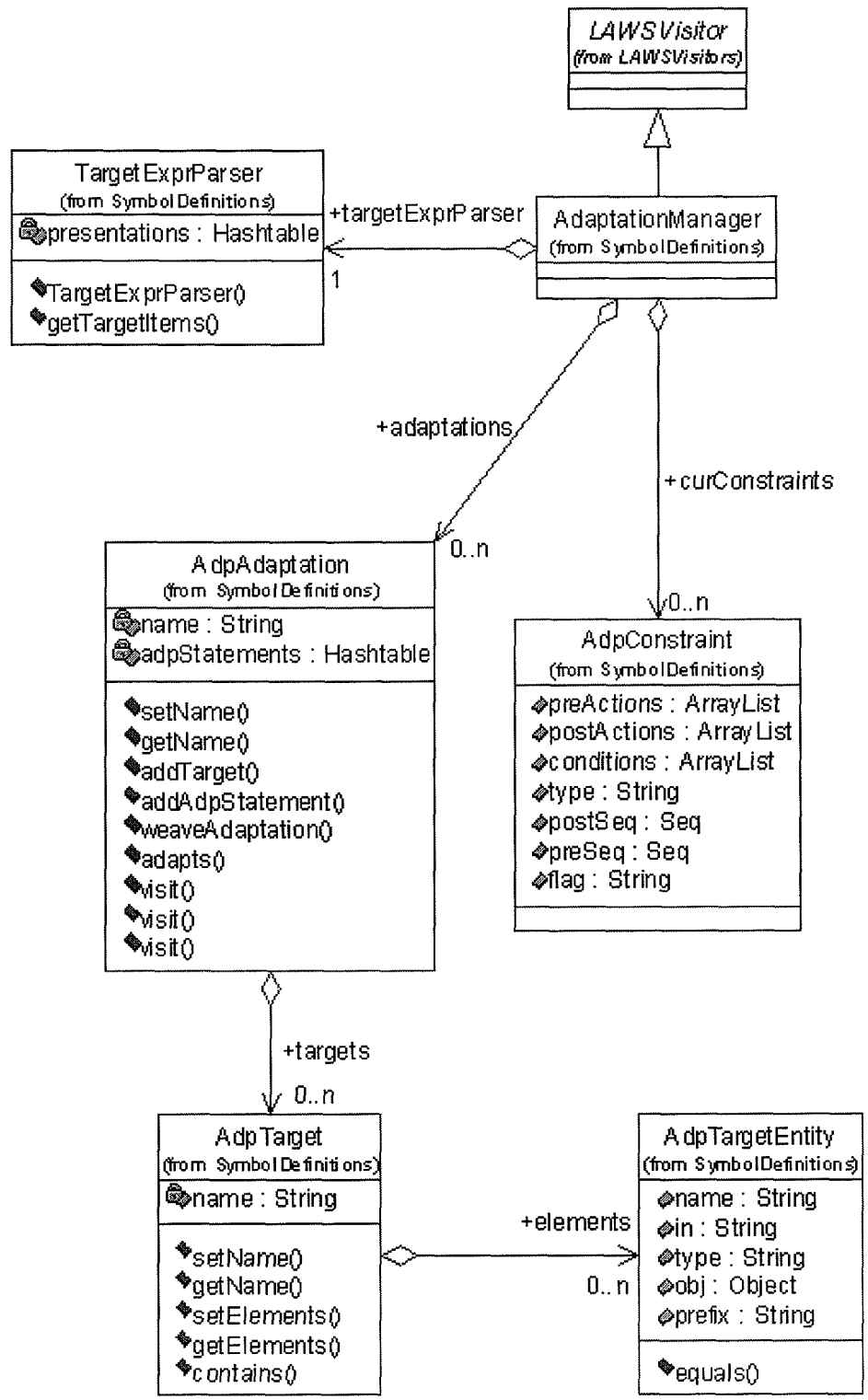
Figure 35 - Adaptation weaver and the helper classes

```
- <sdv:CTPut rdf:ID="CVP1cmd1">
    <!-- User Profile Manager Task ID    -->
    <sdv:cTaskID>5555</sdv:cTaskID>
    <!-- Request: checkValue    -->
    <sdv:reqID>23</sdv:reqID>
  - <rdf:value>
    - <rdf:Seq>
        <rdf:li rdf:resource="#SEReg1." />
        <rdf:li>newsID</rdf:li>
        <rdf:li rdf:resource="#SEReg37." />
      </rdf:Seq>
    </rdf:value>
  </sdv:CTPut>
```

Figure 36 - Hand-coded conceptual task call in RDF description

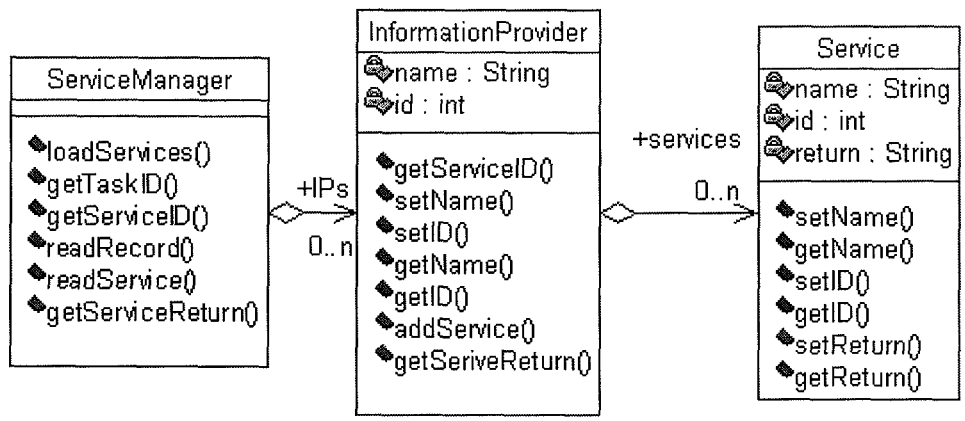

Figure 37 - Service manager and the helper classes

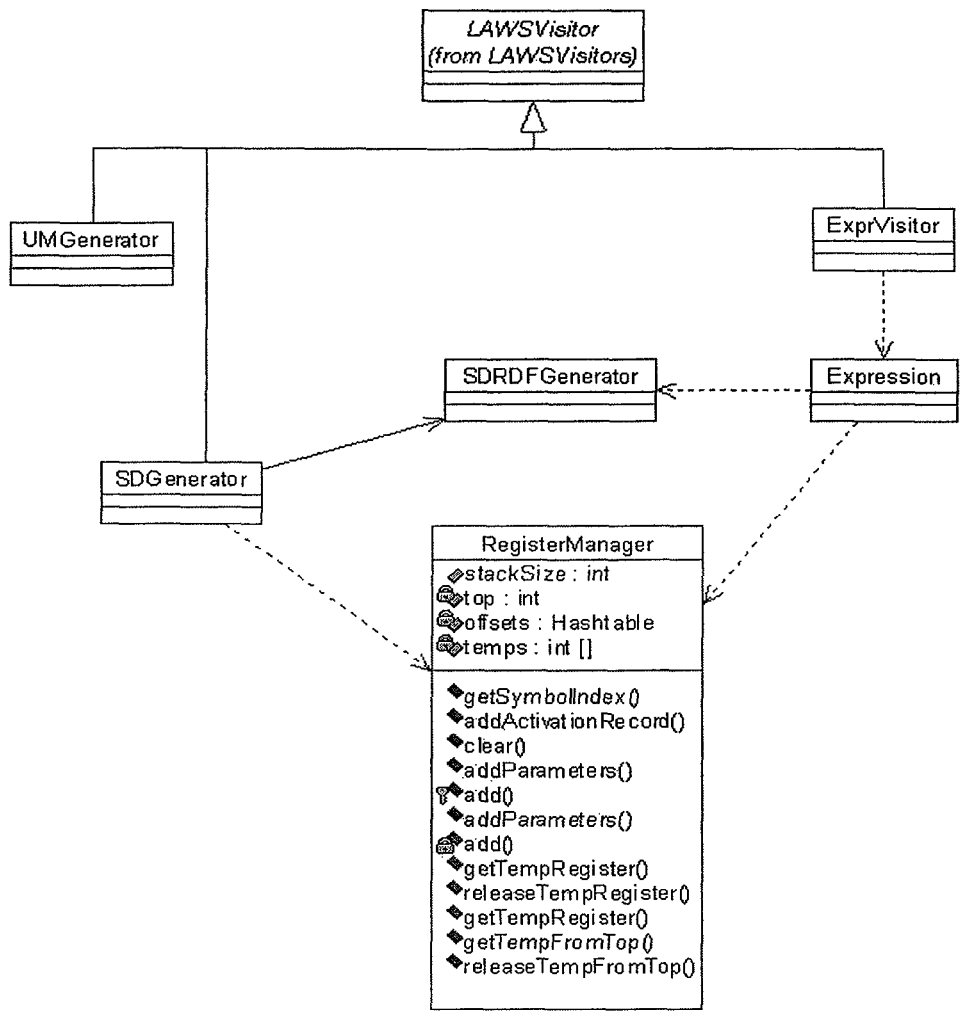
Figure 38 - Code generator classes
```
main fragment mainPage {
        item item1: Text('Hello World!')
        {
                largeFontSize;
                italic;
                color = 'red';
        }
}
```
Figure 39 - Hello-world sample program

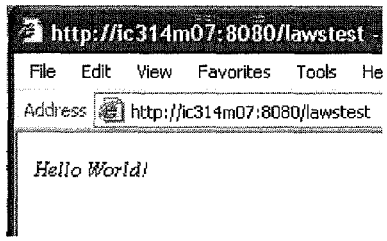

Figure 40 - The output of hello-world on a desktop browser

```
1   - <rdf:Description rdf:about="http://ias.cs.unb.ca/~mehran/SiteDesc#Move262007846SEReg33">
        <rdf:value>http://ias.cs.unb.ca/~mehran/SiteDescVocab#LargeFontSize</rdf:value>
        <rdf:type rdf:resource="http://ias.cs.unb.ca/~mehran/SiteDescVocab#MoveReg" />
        <sdv:lhsRegister>33</sdv:lhsRegister>
    </rdf:Description>
6   - <rdf:Description rdf:about="http://ias.cs.unb.ca/~mehran/SiteDesc#Move346870709SEReg32">
        <sdv:lhsRegister>32</sdv:lhsRegister>
        <rdf:value>http://ias.cs.unb.ca/~mehran/SiteDescVocab#Italic</rdf:value>
        <rdf:type rdf:resource="http://ias.cs.unb.ca/~mehran/SiteDescVocab#MoveReg" />
    </rdf:Description>
11  - <rdf:Description rdf:nodeID="A4">
        <rdf:type rdf:resource="http://www.w3.org/1999/02/22-rdf-syntax-ns#Seq" />
        <rdf:_1 rdf:resource="http://ias.cs.unb.ca/~mehran/SiteDesc#mainpageinit" />
    </rdf:Description>
15  - <rdf:Description rdf:about="http://ias.cs.unb.ca/~mehran/SiteDesc#Move1178383901SEReg511">
        <sdv:lhsRegister>511</sdv:lhsRegister>
        <rdf:type rdf:resource="http://ias.cs.unb.ca/~mehran/SiteDescVocab#MoveReg" />
        <rdf:value>Hello World!</rdf:value>
    </rdf:Description>
```

Figure 41 - Partial code generated for hello-world example

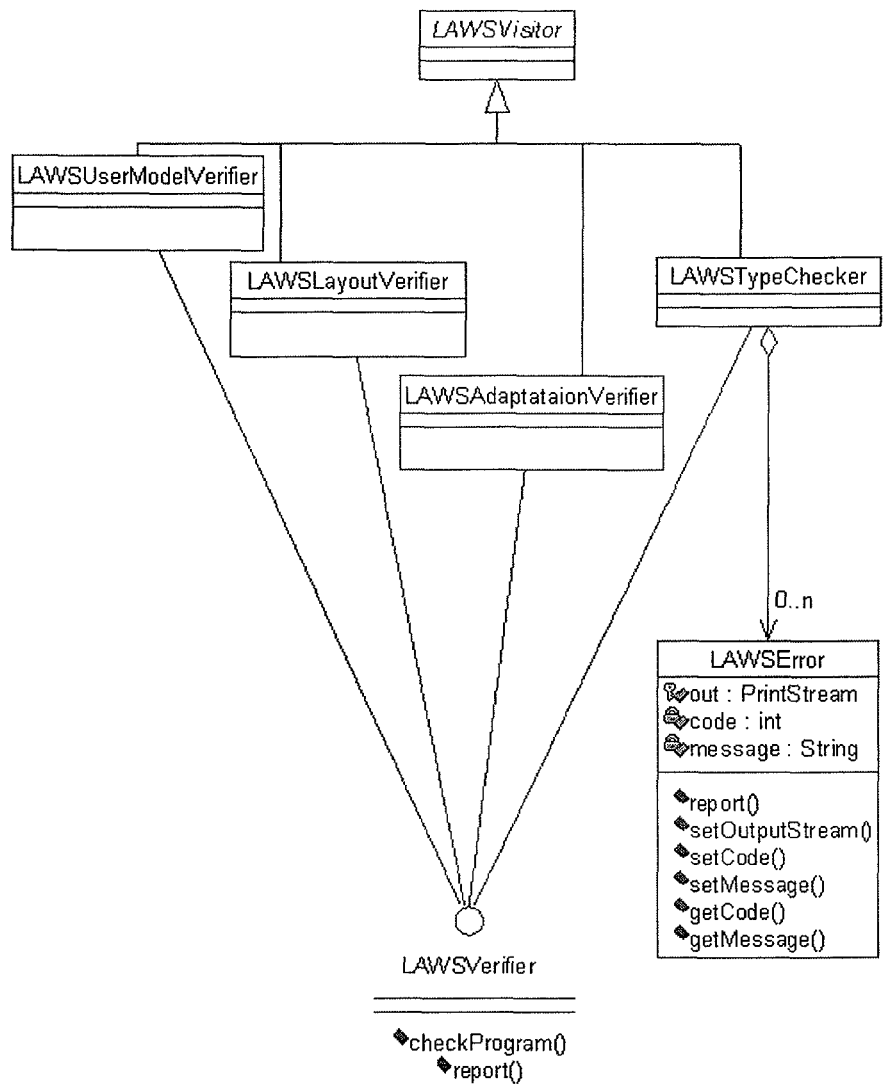
Figure 42 - Verifier class hierarchy

HIGH-LEVEL HYPERMEDIA SYNTHESIS FOR ADAPTIVE WEB

CROSS-REFERENCE TO RELATED APPLICATIONS

This is the first application filed for the present invention.

MICROFICHE APPENDIX

Not applicable

TECHNICAL FIELD

This application relates to hypermedia in general, and to a method of high-level hypermedia synthesis for adaptive webs, in particular.

BACKGROUND OF THE INVENTION

Adaptive Web Sites

An adaptive web site (AWS) transforms a page request into a final page response by considering some or all of the available information about: (1) the page requested, (2) the user, (3) the way the site has been used, (4) the environment of the site, and/or (5) the environment of the user. Transformations can include: (a) modifications to content (such as the inclusion or exclusion of images, paragraphs, or links); or (b) modifications to the presentation of the content (such as swapping different presentation formats for equivalent content, transforming a content fragment into another format, or removing a piece of content).

AWS Frameworks

An adaptive web site framework attempts to describe the interplay between the content of a web site, the usage of that content, the users who consume the information, and the packaging and navigation structure of that content. From this, we can see that there are many potential data inputs arising from those interacting components. The AWS frameworks make useful adaptations to the web sites based on data available, and so to maximize available data it can do usage mining, structure mining, content mining, and user profile acquiring as well as clustering to find groups within each or across multiple streams of data. Usage is meant to be interpreted broadly to include, without limitation, any browser activity, which may be deterred from or without limitation: (i) the low-level browsing of single pages (used in, for example, session reconstruction from page views); (ii) transactions, which are collections of page views to accomplish a purpose; (iii) finding sequences of concepts that a person browses (which is similar to transactions, but is even more abstract); (iv) finding sets (or sequences) of product purchases; (v) finding time-related patterns of activity or time-independent patterns; (vi) finding patterns within a single user's activity; or (vii) finding patterns common to large groups of people.

SUMMARY

According to one aspect of the present invention, there is provided a process for dynamically generating browser-ready code from a high-level code description of a web page written in a first predefined language having one or more adaptive features and from one or more constraints associated with a request for such browser-ready code comprising the steps of compiling an intermediate code description in a second predefined language from the high level code description, which intermediate code description characterizes the adaptive features as a set of adaptive variables; receiving the request at a synthesis engine; the synthesis engine reading the intermediate code description to extract the set of adaptive variables associated with the web page; the synthesis engine obtaining and storing one or more constraints associated with the request either from the request itself or from external data sources to serve as values for the set of adaptive variables.

Other aspects and features of the present invention will become apparent to those ordinarily skilled in the art upon review of the following description of specific embodiments of a method of high-level hypermedia synthesis for adaptive web in conjunction with the accompanying drawing figures.

BRIEF DESCRIPTION OF THE DRAWINGS

Embodiments of the present invention will now be described, by way of example only, with reference to the accompanying drawing figures, wherein:

FIG. 1 is a schematic block diagram of the adaptive web system components and their interdependencies FIG. 2 is a schematic block diagram of communications between the User Profile Manager (UPM) and the Synthesis Engine to Conceptual Tasks (SE2CT) Interface FIG. 3 is a code listing for user model vocabulary for the E-news domain FIG. 4 is a code listing for Interested Topics class in user model vocabulary FIG. 5 is a code listing for the description of the user model FIG. 6 is a class diagram for the User Profile Manager (UPM)

FIG. 7 is a schematic block diagram of the communications between the Usage Group Handler (UGH) and the Association Miner (AM)

FIG. 8 is a schematic block diagram of the communications between the Usage Group Handler (UGH) and the Synthesis Engine to Conceptual Tasks (SE2CT) Interface FIG. 9 is a code listing for the group model vocabulary for the E-news domain FIG. 10 is a code listing for the description of the group model FIG. 11 is a class diagram for the Usage Group Handler (UGH)

FIG. 12 is a flow chart for K-means+algorithm

FIG. 13 is a diagram of clusters before splitting

FIG. 14 is a diagram of clusters after splitting

FIG. 15 is a schematic block diagram of cooperation between the Usage Group Handler (UGH) and the Association Miner (AM)

FIG. 16 is a schematic block diagram of the communications between the Association Miner (AM) and the Synthesis Engine to Conceptual Tasks (SE2CT) Interface FIG. 17 is a class diagram for the Association Miner (AM)

FIG. 18 is a code listing for the Apriori algorithm

FIG. 19 is a code listing for the Apriori-generate procedure

FIG. 20 is a code listing for the algorithm that generates association rules

FIG. 21 is a schematic block diagram of the high-level architecture of the system FIG. 22 is a table that identifies information found in the user agent profile (UAProf)

FIG. 23 is a schematic block diagram of interaction between Concept Manager (CM) classes FIG. 24 is a diagram of color conversion FIG. 25 is a schematic block diagram of the hierarchy of a parsed Adaptive Web Language (AWL) program FIG. 26 is a schematic block diagram of presentation-related semantic objects FIG. 27 is a schematic block diagram of user model class hierarchy FIG. 28 is a schematic block diagram of the adaptation classes FIG. 29 is a schematic block diagram of Concept class hierarchy FIG. 30 is a schematic block diagram of Relationship class hierarchy FIG. 31 is a schematic block diagram of Statement class hierarchy FIG. 32 is a schematic block diagram of Expression class hierarchy FIG. 33 is a schematic block diagram showing that most of the Adaptive Web Language (AWL) Compiler components are designed as visitors FIG. 34 is a schematic block diagram of Symbol tables classes FIG. 35 is a schematic block diagram of Adaptation weaver and the helper classes FIG. 36 is a code listing of a hand-coded conceptual task call in Resource Description Framework (RDF) description FIG. 37 is a schematic block diagram of Service manager and the helper classes FIG. 38 is a schematic block diagram of Code generator classes FIG. 39 is a code listing of the hello-world sample program FIG. 40 is a partial screen capture of the output of hello-world on a desktop browser FIG. 41 is partial code generated for the hello-world example FIG. 42 is a schematic block diagram of Verifier class hierarchy Like reference numerals are used in different figures to denote similar elements.

DETAILED DESCRIPTION OF THE DRAWINGS

FIG. 1 illustrates synthesizing web pages from high-level description to browser-ready code, provided in accordance with an embodiment of the present invention.

An automated web page is synthesized from a domain-dependent high-level description. Browser-ready code is generated "on-the-fly" (meaning at the time of the request) considering the individual user needs/preferences and other contextual and repurposing data.

The description of the web site is accomplished using a high-level domain-dependent description language called Adaptive Web Language (AWL). Domain concepts and relationships, presentation ontology, and adaptation rules form the language elements as well as control structures. A domain-dependent compiler, in an offline procedure, translates high-level site description to a domain-independent intermediate format. Description at this level is accomplished using an intermediate language named Intermediate Format Vocabulary (IFV). Hypermedia concepts and relationships, instructions to interact with data sources, page layout concepts and constraints, and means to access internal data of the page synthesizer form elements of IFV, as shown in FIG. 1.

Synthesis Engine (SE) reads the site description in intermediate format, and generates technology-dependent browser-ready code on a per-session-per-request basis. SE will acquire data from specified data sources to populate pages and also to make decisions for adaptation. The structure of a page and the generated layout might be dissimilar for different users and/or different context. Since the hyperlinks incorporated into the pages could also be adaptive, users' experiences will look different regarding the structure of the web site.

Data sources are called Conceptual Tasks (CTs), and they assume various tasks. Maintaining user profiles and group profiles, association mining, interfacing to external databases through industry-standard protocols, and network monitoring are examples of functionality provided by CTs (see FIG. 2).

SE is able to generate code for different markup languages; XHTML and WML are two common languages. Based on the type of device and browser that the user is using, such as whether it is a desktop or handheld device, the appropriate output format is delivered. SE is also able to resize images and cut down on the size of paragraphs if the limitations on screen size and memory of a user's device require such. All final-code cases are synthesized from the same high-level description.

SE is also able to incorporate necessary functions from existing libraries of scripts, if the target markup language supports scripting. An example is incorporating some JavaScript functions into an HTML page in order to fulfill a required functionality. The purpose of including scripts in the under-synthesis pages is to achieve more interactivily with users and support simple operations and adaptations that do not require a complete page refresh. Such pages will be more responsive by using asynchronous data exchanges between the web browser (the client) and the web server.

Today's automatic web site generators are domain-specific, one-time processes to generate particular web applications. Here the SE is going to be the same for all domains and applications, and the architecture has quite a few reusable components. The dynamic web site pages generation process (run-time web page generation engine) takes into account contextual and user related information at run-time. This provides maximum flexibility in the development of adaptive web sites and allows the generation of web pages on-the-fly. Adaptation is the focus of high-level description language, so this is a mean that makes building adaptive websites more convenient.

Existing web site design and maintenance tools are incapable of effectively separating the role of web designer from the role of application designer and manager. In this architecture and synthesis process, having a true high-level design via a domain-specific language enables domain experts to focus more on the application design rather than web aspects of the application.

Current dynamic generation of web pages includes techniques to select appropriate web components in order to populate pre-defined page templates. In this approach, page layouts are generated and the structure of the web site is determined at run-time based on the user-defined content and the adaptation variables.

Since there is no pre-designed (ready-to-use in some markup language) static web page or template, and everything is composed or modified at run-time considering the current user and the current context, preparing responses in some cases might look a bit slower For an alternate embodiment, this is addressed by providing faster servers and database systems, and/or by embedding some caching mechanism to detect when the context of a page request has not changed for an already-synthesized page in the cache.

In one embodiment of the present invention, a Web system consists of IDE, AWL, compiler, and SE as well as an application such as the adaptive electronic news delivery application (eNews for example). The aim of this application is to collect news items from different sources and provide content, presentation, and navigation paths adaptation using individual user's preferences and browsing behaviour and context information.

This approach allows application designers to focus on domain concepts, presentation specifications, and repurposing of information when building a web site, rather than browser and system issues, which may be associated with increasingly variable user environments. The framework supports many common features of adaptive web sites such as user profile management and group handling, both at the High-level Description Language (HDL) and database levels.

Having features like automatic script incorporation and asynchronous data exchange will allow movement towards the current trend of the web industry—adding capabilities into web services that were traditionally in the scope of application software.

FIG. 1 depicts the system components of a system and their interdependencies according to one embodiment of the invention. Synthesis Engine (Page Composer) is at the heart of the system and interacts with almost every other part of the system, either directly or through provided interfaces.

When a user (End User) sends a page request to User Front End (UFE) through a Web Server, the UFE converts the incoming Uniform Resource Identifiers (URL) request to a synthesis request by adding some context information and passes it on to the Synthesis Engine (SE). This information is about user ID, the user browsing device, and the user session. SE will compose a page based on the requested page and return it to the UFE along with page components (images, etc.) if any.

To compose (synthesize) Web pages, SE refers to the definition of pages and other concepts existing in the Site Description (SD) and completes the variable implementation by retrieving data needed for decision making and page population from Conceptual Tasks (CTs) or through the possible use of default parameters. SD is the description of the intended web site in intermediate format, understandable by SE. This intermediate-format description can be coded manually or be generated automatically from a high-level description, by using a compiler.

The remainder of this section describes the implementation of the system and process of the current invention with reference to the "Adwert framework" or preferred embodiment.

Synthesis Engine

Synthesis Engine (SE) is in charge of composing the requested page for an adaptive web site. Upon arrival of the user's request, SE reads the Site Description (SD) information in order to determine the structure of the requested page. In addition to SD, SE might contact some CTs to obtain information for composition of the page structure and for laying out the page components. CTs might also be contacted by SE to retrieve data used in populating the under-construction page. CTs are generally application-domain specific components that are used to deliver applications pertaining to a specific domain.

Page Request and Response

A page synthesis process is initiated upon arrival of a page request from the User Front-End (UFE). The UFE passes the following information to SE:

User ID: generated automatically by UFE to uniquely identify each user

Session ID: generated automatically by UFE to uniquely identify each user session.

User's Browser Type: if the client prefers code in XHTML or WML format.

User IP Address: client IP address.

Requested URL: user's requested page/concept.

SE listens to User Datagram Protocol (UDP) port 6666 to receive a request packet from the UFE in the format specified in Table 1.

TABLE 1

Format of request from UFE to SE

| 4 bytes | 1 byte | 6 bytes | 1 byte | Variable length | Variable length |
|---|---|---|---|---|---|
| User IP | Browser Type | Session ID string | Length of User ID string | User ID string | URL |

In the mentioned packet, the IP address comes from high byte to low byte. For example, if the user is behind a machine with IP address 192.168.1.100, then the first byte of the packet would be 192. The URL has the format of:

http://hostname/RequestedPage?p1&p2&...&pN where p1, p2 ... are URL parameters. Session ID is a string of printable characters. If browser type value equals zero, then the client's browser has requested a page in WML format. If the User ID that UFE sends to SE starts with an asterisk, then SE realizes that this page request belongs to a logged-in user. This means that the User ID parameter has not been generated automatically by UFE.

A response from SE to UFE includes series of UDP packets; each contains a web component (e.g., HTML file, image file, etc), plus the following information:

Content I type: specifies the type of the component (e.g., image/vnd . wap . wbmp)

More Flag: is this the last packet of the response?

URL: this is a response to the request identified by this URL

The format of data in the payload of each UDP packet is specified in Table 2.

TABLE 2

Format of response from SE to UFE

| 2 bytes | Variable length | 1 byte | 1 byte | Variable length | Variable length |
|---|---|---|---|---|---|
| Length of URL | URL | More Flag | Length of content Type string | Content Type string | Binary stream |

The URL for each web component is usually the URL that the client side will use to refer to that component, which might come with one or more parameters. If UFE manipulates the URLs, both the incoming requests and the links in web pages, then it should use the modified version of each URL to retrieve the correct component.

'More Flag' indicates if this is the last packet (zero=last packet). Content type string indicates the type of the binary stream (e.g., text/html or image/JPEG) and can be at most 255 bytes long. Binary stream is the data of the web component, for instance, contents of a JPEG file.

SE might send one or more 'commands' to UFE before sending response packets. Each command is a single packet and is composed of two parts: parameter and value. The format of data in the payload of each UDP packet is specified in Table 3.

TABLE 3

Format of command from SE to UFE

| 4 bytes | 1 byte | Variable length | Variable length |
| --- | --- | --- | --- |
| Must be 0x00010001 | Length of Parameter string | Parameter string | Value string |

Values of the first to the fourth byte of the payload must be 0x00, 0x01, 0x00, and 0x01, respectively. Parameter string can be 255 bytes long, but there is no pre-set constraint on length of the value string.

Currently only one command is implemented and supported by UFE: "Change User ID". The parameter of this command is users ID and the value is the new User ID of the user for which this response is prepared. UFE should use this new ID for all future requests from that user.

Synthesis Process

The synthesis process of each page (or web fragment in general) starts upon receipt of a request from UFE (see SE Shell section below) and spawns a synthesis thread to take care of page (fragment) composition and preparation. Each synthesis procedure encompasses the following steps:

Page Structure Composition
Layout Generation
Automatic Adaptations
Final-code Generation When the final code (browser-ready code) is generated, the SE process returns the code along with page components like images and applets back to UFE. SE might send one or more commands (see page Request and Response section above) to UFE.

Page Structure Composition

For each synthesis process, the starting point is finding the correspondence between the incoming URL and a concept in Site Description (SD) (see Intermediate Format Vocabulary and Site Description section below). When the URL contains solely the name of the web site (like one which is usually received as the first request from a user) then SE will look for a page with the "Default Page" property, and starts the page composition from that point. If the incoming URL contains a specific requested page, then SE will query the SD for that particular page definition.

SE knows only semantics that are defined in Intermediate Format Vocabulary (IFV), including the hypermedia concepts and the defined relationships. It is presumed that the application web site is therefore defined in terms of IFV. SE starts with the 'base' concept (which is often a Page concept) and explores all of the defined properties and relationships of that concept down to the point that all constituting components of that concept are known and all page-population data is present. At this point, all properties of all page components have final values except for those properties that are related to the page layout.

As SE goes through the mentioned traverse, it constructs a graph named Page Structure Graph (PSG) with a hierarchy much the same as the concept hierarchy defined in SD. Despite SD, this constructed graph does not have any uncertain relationships (relationships that define the alternatives in realization of a component or bind the presence of a component to a constraint) and represents a page that observes the defined constraints. If data of a component (e.g., a text component) is supposed to be provided by a Conceptual Task (CT), then that CT will be contacted to retrieve that data. Note that all constraints and all system operations (like those that specify how and which CTs should be contacted) are parts of SD.

The PSG is built by a separate object and the Builder software design pattern is used here. This means that the SE process instructs a separate object (the builder) to build the graph, but how the graph is actually implemented is an internal matter of that builder.

Layout Generation

The Page layout generation process encompasses answering two essential problems:

1. Placement: What is the relative position of each page component; in the other words, in what order are the components going to be placed in the page?
2. Formatting: Addresses issues related to appearance of each component. For example, for text components, the appropriate values for properties like font, color, size, and so on are decided. For an image component, this may include properties like resizing factor, converting to black and white (B&W), etc.

Placement

A page can include one or more tables to implement the positioning. The tables can appear at any level of page hierarchy, and they can be nested. The part of constraints of IFV that are related to layout are actually guidelines for the layout generator to determine the appropriate place of each component in the respective table.

The layout constraints are divided into four categories:

3. Relative positioning: Specify the relative positions of two Web Building Blocks (i.e., fragments or components): PlaceAbove, PlaceRight, PlaceBelow, PlaceLeft, PlaceNotAbove, PlaceNotRight, PlaceNotBelow, PlaceNotLeft.
4. Table-margins positioning: Specify if a component should be placed as close as possible to one of the table margins: PlaceTop, PlaceLeftMost, PlaceBottom, and PlaceRightMost.
5. Alignment: Align two Web Building Blocks: VerticalAlign, HorizontalAlign.
6. Binding: Confine two blocks to be immediate neighbours: KeepTogether.

Each layout constraint can constrain a single Web Building Block, like PlaceTop (places a component at the top row of the respective table), or constrain two components, like PlaceAbove (places a component above another). In the latter case, two components must share the same parent in the PSG hierarchy.

The layout will be generated for those components for which at least one of its sub-components has a layout constraint upon it. If this is not so, then sub-components will appear on the rendered page in the same order as they are described in Site Description (SD). This can be interpreted as an implicit layout specification in SD.

As expected, the layout generation function actually solves a Constraint Satisfaction Problem (CSP) for each Web Building Block that requires this. This would be a 2D placement CSP that observes binding constraints as well. For performance purposes, the algorithm solves two 1D and one binding placement CSP. Here is the procedure 7. The layout constraints are reorganized into three groups:
    (a) Those that are related to vertical positioning of components: PlaceAbove, PlaceBelow, PlaceNotAbove, PlaceNotBelow, PlaceTop, PlaceBottom, HorizontalAlign.
    (b) Those that are related to horizontal positioning of components: PlaceLeft, PlaceRight, PlaceNotLeft, PlaceNotRight, PlaceLeftMost, PlaceRightMost, VerticalAlign.
    (c) Binding constraint: KeepTogether.

8. The third group joins both groups 1 and 2 to create the Vertical Positioning Constraints (VPC) group and Horizontal Positioning Constraints (HPC) group.
9. Each node in PSG preserves all layout constraints that specify any positioning limitation between each two child components. Also, each node contains a table denoting the current placement of its children. This table is called Layout Table.
10. The layout table is initialized by placing all children in column 0 and rows 0 . . . n–1, where n is the number of children of this node.
11. Solve VIC-CSP. Some components might move to other columns so the vertical constraints can be satisfied (e.g., consider HorizontalAlign constraint). Some table cells might become vacant. If a row becomes empty, then all rows below that row will shift up one level.
12. Solve HPC-CSP across all rows. In each row, do not leave any column unoccupied as much as possible; i.e., if a column becomes empty, all columns at the right side will shift to left to fill the empty space.
13. The output of steps 3 and 4 is a placement solution in which all constraints are satisfied except for KeepTogether. Each constraint of this type involves two components, say C1 and C2. The cost of movement is computed for moving C1 to the neighborhood of C2 (any four possible positions) and vice versa. The cost of movement is the number of constraints that would be violated by performing that movement. A movement cannot cause a violation of any KeepTogether constraint in the destination, though a violation at the source of movement is allowed. The least expensive movement will be accomplished. No empty row or column should be left in between.
14. If any movement has taken place in the above step, repeat steps 5-7.
15. All constraint satisfaction loops will have an upper boundary for repetition. This puts in escape point if the set of constraints at each phase or as a whole is not consistent.
16. Push each component upward as far as no constraint is violated.
17. Push each component to the left as far as no constraint is violated.
18. Determine the dimensions of the layout table.

Since it is possible that the above CSPs do not converge (because of the inconsistency in layout constraints), then each loop should not iterate infinitely. SD is generated by a compiler that does not generate inconsistent intermediate code.

The designer can still define the layouts of the pages separately (for example through CSS) and add them to the site description as the concrete elements. Note that because of the limitations in standard as well as device displays, no layout will be generated for WML pages (see Final-code Generation section below).

Formatting

In one embodiment, formatting is supported for text and tables. Moreover, any Web Building Block can be surrounded by different types of borders. The concepts and relationships corresponding to formatting operations can be divided into the following groups 19. Table
    Cell background color
    Cell vertical alignment
    Cell horizontal alignment
20. Text
    Color
    Scale (note that this is different from font size)
    Font face
    Bold, italic, underlined, emphasized, strong
    "Fuzzy" font sizes, e.g. Large, Small, etc.
21. Bordering
    Frame (box)
    Sides
    Below/above
    Any single side SE surrounds a component (Web Building Block (WBB)) within a border by using tables. The surrounded component is placed within a single-row single-column table with appropriate frame definition. Text Styling and Bordering are not supported in WMI.

Final-code Generation

This is the step in which the final form of a web page is generated in a Markup Language (ML). In one embodiment, XHTML and WML are supported. When the PSG of a page is ready and layout generation is accomplished for all demanding nodes, the SE will traverse this graph to find the markup language properties of page components. Throughout this step, each node of the graph adds some ML tags to the page ML code (final code) and any population data (mostly text) will be added to the ML code as well. All linkage relationships are converted to ML anchors and the sources of concrete components (like images) are specified within the code as well.

The properties of web components might add tags or properties to ML code. For instance, if the dimensions of an image are specified in SD, that would add parameters to the image tag in the context of the (current) ML language.

As mentioned formerly, in placement problems, the components will be positioned using tables. These tables will be converted to ML tables at the presentation generation phase. Currently, all table cells use constant cell padding. No layout tables will be generated if the target ML is WML, because of lack of support for nested tables.

WML pages are partially different from XHTML pages not only in syntax, but also in structure. For example, an XHTML page is simply composed of Header and Body parts, while WML pages might consist of a Header and multiple Card parts such that each has its oven title (despite XHTML in which the page title is a part of the Header information). Some tag parameters in WML are mandatory while they are not in XHTML. Whether the respective property is or is not specified in the SD, then SE should provide the parameter in final code anyway.

Thanks to separation of the presentation generation step from page composition, SE is able to generate code in different markup languages, and differences between XHTMI, and WML proves the capabilities.

Automatic Adaptations

At the time of presentation generation, some adaptation/changes might be applied to the concrete elements of a page, like images. For example, if the page rendering is in WML, then all page images will be converted to Wireless BitMap (WBMP) (format standard for WML pages) and resized to meet the limitations of devices that usually use this standard, mostly hand held devices. Further details of the image conversion are provided in the Image Format Converter component, below. Note that the author is still able to provide the converted and resized images directly, as a part of SD.

SE Registers

Synthesis Engine contains 512 registers. These registers are used for keeping user/client information (such as client IP, user ID, etc.) and passing link parameters. Furthermore, there are free general-purpose registers for internal operations, to be used as instructed by Site Description. In SI, in almost all places that the object of a Resource Description Framework (RDF) statement is a literal, that literal can be substituted by a register value.

Table 4 shows usage of SE internal registers. SD is not supposed to write any register in range 0 to 31, though it can. The parameters that accompany a URL can be used by description of the "receiver" page (the page specified by the current URL request) via 16 SE registers, named Stack of Link Parameters.

TABLE 4

SE internal registers

| Register No. | Count | Description |
|---|---|---|
| 0 | 1 | Client IP |
| 1 | 1 | User IC |
| 2 | 1 | Requested URL |
| 3 | 1 | Browser Type (0: WML, otherwise: XHTML) |
| 4 | 1 | Session ID |
| 5 | 1 | Device ID (Type of client device) |
| 6 | 1 | User Login Status (0: not signed in, 1: signed in before, 2: just signed in (through this)) |
| 7-15 | 9 | Reserved |
| 16-31 | 16 | Stack of link parameters |
| 32-512 | 96 | Available general-purpose registers |

SE Shell

SE Shell is the class (object) that starts the SE application. SE Shell performs two basic operations:

22. Opens the Intermediate Format Vocabulary as well as Site Description (SD) files and then initializes the SD wrapper object (by making it import the cited descriptions into memory and pruning the unnecessary statements like comments and labels).
23. Spawns an "SE Request Handler" thread that listens to UDP port 6666 for incoming requests from UFE. The SE Request Handler thread in turn spawns an SE thread (process) for each incoming request from UFE.

As mentioned formerly, SE threads are in charge of composing the requested pages and returning them to UFE along with all concrete page components.

Intermediate Format Vocabulary and Site Description

The Intermediate Format Vocabulary (IFV) provides a schema for description of web sites in an intermediate format. The semantics defined in intermediate format are mainly based on hypermedia concepts and relationships. This makes this kind of description domain- and application-independent. The schema (vocabulary) is described in Resource Description Framework (RDF), which is essentially a framework for describing machine-understandable semantics.

Intermediate Format Vocabulary

The third version of IFV provides a schema for description of a simple web site in RDF. The concepts and properties defined in this vocabulary can be categorized into the following groups:

Web Components

Definitions of Page. Page Header and Body, Text, Image, Canvas, Formatting and Aligmnent, Page Layout, etc.

Relationships Between Concepts

Composition, Realization, Linkage, Placement (layout), etc.

Markup Languages

Tags (pair/single), Tag Attributes for HTML and WML.

Conditions

Operands (local resources, synthesis engine registers), Operators, List of Conditions.

Actions

Interoperation with Conceptual Tasks, Operations on Local Resources, Operations on Synthesis Engine Registers, Executing other Directives, List of Actions, Placement Instructions, etc.

Directives

Constraints (Component Selection, Component Placement (layout), Linkage, Pseudo Constraint), Operations (List of Conditions, List of Actions).

User Interaction

Text boxes, password field, multiple-choice lists (drop-down and radio-button styles), check boxes, buttons, file upload.

For file upload, SE will select an appropriate HTTP method (GET or POST) if no certain method is specified by author. The current criterion is size of the data block to be transferred.

SE evaluates constraints of a Web Building Block (WBB) before any other statement (property) of that WBB.

The object of a format property might be an indirect resource. This means that the name of the resource (expected to be a formatting concept in IFV) is mentioned by a register. This capability is limited only to format property.

From definition point of view, Pseudo Constraint is like other types of constraints, but has no effect whatsoever on the container WBB.

In the definition of IFV, the following standards are used:
RDF (http://www.w3.orq/1999/02/22-rdf-syntax-ns#)
RDF-Schema (http://www.w3.org/2000/01/rdf-schema#)
XMI. Schema (http://www.w3.org/2001/XMLSchema#)

Sample Site Descriptions

In one embodiment of the invention, e-News is used. For the larger domain, we have chosen e-News, because of the following reasons:

24. An e-News system has much potential for adaptation. As an example, the location of news items (page layout) in the front page and other main pages can be adapted to individual users or certain conditions.
25. 2 An e-News system is more dynamic than other domains like e-Tailer: There is almost a constant current of data streaming from different data sources to the system to be presented.
26. For this implementation (which is model-based), there are well-accepted standards for data exchange like Really Simple Syndication (RSS) (based on RDF) that accelerates the implementation and guarantees the interoperability of the system with existing tools.
27. The e-News system is a true scalable system, in both complexity of services and size of the web site. Providing a working "minimum system" would be easier in e-News context.

The sample e-News application is a mimic of UNB News provided by the University of New Brunswick. The front page contains the banner graphics, topics of 3 most recent news items with the first (roughly) 300 characters of the news body, and sole topics of 4 recent news items. To get the full-page news, the user clicks on the respective topic. A full news page includes the banner graphics, headline (topic), header (date+time+correspondent+location), full news body, a link to a "recommended news item", and a link at the bottom of the page to return to the front page.

The user can choose to see news items that belong to a particular category. The list of news categories is available on the front page. The user can choose to browse the web site by logging in or continue as an anonymous user (a cookie will be activated in this case).

When a user visits a full-page news item, his/her profile will be updated in order to keep a history of the news items he/she has visited so far. When the user returns to the first page, he/she does not see the (incomplete) news-body of the news items that are already visited.

The other adaptation is based on the user location (Fredericton or Saint John); the banner at top of the page is different for users that connect from different locations (detection is based on the source IP address). Also the news items that are related to Fredericton will precede those that are related to Saint John, if the user is connecting from Fredericton (the same thing is applicable to Saint John users).

For each news item on the front page, if the item is new to the user (regardless of whether user has seen the full page or not), a "new" graphical icon will be placed beside that item. Therefore, when a returned user is detected, either through login or through tracking cookie, that "new" icon will show news items that have been added to the front page since last time user had visited the web site.

Implementation of Site Wrapper

This wrapper acts as a Java interface for the Site Description (SD) as well as IFV. Synthesis Engine (SE) uses the services of this class to access the concepts, relationships, and properties described in intermediate format. From another perspective, this wrapper acts as the interface between SE and SD.

Examples of functions that SD Wrapper provides for SE are as follows: transferring the SD models between the system memory and disk; pruning unwanted and memory-consuming properties (like comments and labels) from the model; retrieving the resource objects by name (all concepts, properties, and statements are RDF resources); determining if a concept belongs to IFV or SD (application); determining if a resource is a property or concept; returning the type of a resource; determining if two resources are equal; recognizing layout actions; and so forth.

The SD Wrapper is implemented as a standalone thread in the system. In can work with multiple SE processes at the same time, thanks to synchronized access to data resources and tables it maintains.

Like SE, SD Wrapper uses Jena Application Program Interface (API) for all RDF operations. For IFV and Site Description (application), the graphical presentations of all concepts and relationships are available in SVG (Scalable Vector Graphics) format.

Online References of Standards and Specifications
Resource Description Framework: http://www.w3.org/RDF/
HP Labs Semantic Web Research: http://www.hpl.hp.com/semweb/
Extensible Markup Language: http://www.w3.org/XML/
Scalable Vector (Graphics: http://www.w3.org/Graphics/SVG/
WAP Wireless Markup Language: http://www.w3.org/Graphics/SVG/
HyperText Markup Language: http://www.w3.org/Markup/

Synthesis Engine to Conceptual Tasks Interface

SE2CT is the interface between Synthesis Engine (SE) and Conceptual Tasks (CTs). All messages exchanged between the SE and any CT pass through this interface. Each CT is supposed to register with this interface upon startup and declare its point of service.

The main function of the interface between SE and CTs is to locate every registered CT properly so the requests from SE (that bear the receiver's task ID) are delivered to the proper CT and the responses are returned to SE correctly. For this purpose, each CT is supposed to declare its point of service (IP address+UDP server port) to SE2CT upon startup.

Any CT is recognized by its task ID. For registration, the CT sends a packet to SE2CT at UDP port 4444 in the format specified in Table 5.

TABLE 5

| Registration packet from CTs to SE2CT | | |
|---|---|---|
| 2 bytes | 4 bytes | 2 bytes |
| Task ID | CT IP Address | CT Port Address |

In the registration packet, the IP address comes from high byte to low byte. For example, if a CT is located on a machine with IP 192.168.1.100, then the first byte after Task ID would be 192. For two other fields, the high byte comes first as well.

There is no reply from SE2CT indicating a successful registration. A CT can register one or more time, at any time.

Message Relaying

SE2CT forwards all incoming requests from SE to the respective CT and sends the received response back to SE. Each CT is supposed to reply to a request no later than a time limit (currently set to 10 seconds). If timeout happens, SE2CT will no longer accept the response from the CT.

It is possible that a CT will receive a few requests in a row. Therefore, each CT is supposed to be ready immediately to receive the next request even if the previous request is not yet replied to. The format of a request packet from SE2CT to a CT is specified in Table 6.

TABLE 6

| Format of request from SE2CT to CTs | | |
|---|---|---|
| 2 bytes | 1 byte | Variable length |
| Sequence Number | Request ID | String of parameters |

Request number is a serial number that each SE process uses to keep track of the requests already dispatched. RequestID specifies the service that SE has asked the CT to accomplish. If the accomplishment of service requires some parameters from SE, they come serially at the end of message.

Format of the response from CT, back to the same port of SE2CT that the request came from, is specified in Table 7

TABLE 7

| Format of response from CTs to SE2CT | |
|---|---|
| 2 bytes | Variable length |
| Sequence Number | Response |

The CT should repeat the sequence number of corresponding request packet at the header of reply. The SE2CT forwards the response to SE intact, to the same port that the original request came from.

SE uses the format specified to send a request to SE2CT, at port 5555.

TABLE 8

| Format of request from SE to SE2CT | | | |
|---|---|---|---|
| 2 bytes | 2 bytes | 1 byte | Variable length |
| Task ID | Sequence Number | Request ID | String of parameters |

Task ID indicates that this packet goes to which CT. This is the only field that SE2CT actually interprets. The high-byte of Task ID comes first.

If SE sends a packet to SE2CT with an unknown task ID (a Task ID that has not yet been registered with SE2CT), it simply drops the incoming packet and no error message will be returned.

Implementation of SE2CT

SE2CT is implemented as a set of concurrent threads. Beside the shell class that contains tile main function, there are two permanent threads:

The registration thread

The Message Relay thread

For each incoming request from SE, the Message Relay thread spawns a new thread in order to take care of the request and the corresponding reply. This thread will be discarded if the response is forwarded to SE or a timeout occurs.

The interface maintains a table containing all pairs of [Task ID, Point of Service]. This table is used for mapping between a CT's Task ID and its Point of Service.

User Profile Manager

The User Profile Manager (UPM) is an independent system component. It is responsible for providing information about the user and about the user's usage. It is also in charge of instantiating the profile from the user model and updating the profile fields. If the UPM receives a request, it will execute one of the instructions according to the list of parameters attached in the received message, and response the request.

User model and default user profile are described in RDF. The UPM reads the RDF description, creates database tables for the user model, and inserts the default user profile into the database. It also provides services including checking the existence of the user, checking the user's login name and password, creating new user profile, deleting user profile, updating the user's property value, retrieving user's property value, resetting user's property value to be default, checking the validity of the value set, inserting a set of values for their corresponding properties, and retrieving the date of the user's last session.

Communication between UPM and SE2CT

As shown in FIG. 2, the UPM communicates with the Synthesis Engine (SE) frequently through the interface between the SE and conceptual tasks (SE2CT). It accepts requests from the SE2CT which are relayed from the SE and generates responses which will later be relayed to the SE through the SE2CT. The requests may be retrieving or updating contents in a user's profile.

The communication between the SE, the SE2CT and the UPM is through the UDP protocol. The format of packet received from the SE2CT is represented in Table 9.

TABLE 9

Format of packet received from SE2CT

| seqID (2 bytes) | reqID (1 byte) | List of parameters |
| --- | --- | --- |

The seqID (sequence ID) is a unique ID assigned to each request made by users. It is generated by the SE, automatically. The reqID (request ID) will be listed later for the UPM. The format of the list of parameters is predefined. The phases in the list of parameters are separated by the symbol of #. The property name and its value (optional) are separated by the symbol of 'A' as well. The given example can be 'default#password#default', which means user name of 'default' and password of 'default'. Another example can be 'default#language', which means user name of 'default' and another property of 'language'. The format of packet that will be sent from the UPM to SE2CT is represented in Table 10:

TABLE 10

Format of packet sent from UPM to SE2CT

| seqID (2bytes) | Response content |
| --- | --- |

The seqID is the one received from SE2CT. The response content is the string that represents generated results from the UPM Representation of User Model User Model is described as the schemas in intermediate format for describing concepts and relationships existing in the application (in the present embodiment, mainly between users or within users' properties). The user model is described by using the Resource Description Framework (RDF) serialized in XML as described in Manola and Miller, 2004, which is incorporated herein by reference.

Resource Description Framework (RDF) is developed by the W3C for Web-based metadata by using XML as interchange syntax. It can be used to represent information about things (including human beings), even when they cannot be directly retrieved on the Web. It provides inter-operability between applications that exchange machine-understandable information on the Web. RDF emphasizes facilities to enable automated processing of Web resources. A document provided by W3C to describe RDF specifications and provide examples of using RDF can be found in Manola and Miller, 2004.

RDF identifies resources using Web identifiers called Uniform Resource Identifiers (URLs). It is a Web standard, and uses property values to describe web resources. It also uses the terms subject, predicates, and objects. At the core of RDF we have the RDF Data Model for representing named properties and their values. These properties serve both to represent attributes of resources (and in this sense correspond to usual attribute-value pairs) and to represent relationships between resources. The RDF data model is a syntax-independent way of representing RDF expressions. The RDF Syntax is for expressing and transporting this metadata in a manner that maximizes the inter-operability of independently developed web servers and clients. The syntax uses the eXtensible Markup Language (XML). RDF Schemas are a collection of information about classes of RDF nodes, including properties and relations. RDF schemas are specified using a declarative representation language influenced by ideas from knowledge representation, such as semantic nets, frames, and predicate logic, as well as database schema representation models such as binary relational models and graph data models. RDF in itself does not contain any predefined vocabularies for authoring metadata. It is expected that standard vocabularies will emerge, as this is a core requirement for large-scale inter-operability. Anyone can design a new vocabulary. The only requirement for using it is that a designating URL is included in the metadata instances using this vocabulary.

The user model description includes the User Model Vocabulary (UMV) and the description for application-specific user model with default user profile. The UMV is domain dependent but application independent. Different kinds of UMVs for their corresponding domain can be specified in the system and will later be used to define the application-specific user model with default user profile. The UMV contains description of concepts and relationships for all (as complete as possible) user properties in a specific domain (for example, the E-news domain). User properties are described in different classes, in which they belong. Property name and its value range are specified as well. FIG. 3 shows an example of the UMV for the E-news domain. As defined by the UMV example, 'DGModel' is defined as a class to represent demographic information about users. It consists of, for example, properties of age and gender. User's age is represented by an integer number. The value of user's gender may be either 'male' or 'female'. Another class called 'InterestedTopics' (shown in FIG. 4) is defined as the class to represent users' interests in different news categories in the E-news domain, such as national news category and world news category.

The UMV will be used for defining the application-specific user model and default user profile. For each application, an application-specific user model will be defined based on the predefined UMV. A set of appropriate user properties will be selected to describe the user model according to the needs of the application. As presented in FIG. 5, user's age, gender, education level, and education field are used to describe the user's demographic information. Users' interests in different news categories are also presented in the figure. The default user profile will be specified as well. For instance, default value for gender may be chosen as male. The selected user properties and their relationships will be interpreted by the UPM and used for constructing a database structure to store user profiles and the predefine default user profile. The default user profile will be assigned to a new user without any observed information and action. The information will be updated later as long as there is system observation about the user.

Services Provided by UPM

Information of the services provided by the UPM is summarized in Table 11. The services include checking the existence of the user, checking the user's login name and password, creating new user profile, deleting user profile, updating the user's property value, retrieving user's property value, resetting user's property value to be default, checking the validity of the value set, inserting a set of values for their corresponding properties, and so on. When the UPM receives a request from the SE2CT interface, it will execute one of the instructions according to the request ID (reqID in the table) and the list of parameters attached in the received message.

Description of Main Classes

The class diagram for the UPM is shown in FIG. 6. Description of some main classes will be provided as well.

Class Name: CTupm

This class registers the User Profile Manager to the SE2CT first, and then launches a thread for accepting requests sent to it. This class also defines the global variables for the database connection, and the IP address and port number for the SE2CT server. This class specifies the server port for the User Profile Manager as well.

Class Name: CTupManager

This class initializes the User Profile Manager including creating a vector to store the user model structure in memory, creating database tables for the user model, and inserting the default user profile into the database tables. This class also accepts the requests from the SE2CT and starts a new Reply thread to handle the request.

Class Name: Reply

This class interprets the request and reads the request ID. The request ID will determine which service should be used for handling the request. The generated response from the service will be sent back to the SE2CT.

Class Name: UPManager

This class provides functions that actually do operations on the user profile database. These functions will be called by the Reply class to handle the requests from the SE2C f interface.

Class Name: UMDesc

This class interprets the RDF description for the user model and default user profile. It constructs database tables according to the structure of the user and inserts the default user profile. It also creates a vector to store the structure of the user model.

Usage Group Handler

The Usage Group Handler (UGH) is an independent system component. It is responsible for providing information about the group of users. It is also in charge of grouping existing users according to their characteristics. It will assign a new user or reassign an older user into a group based on how close they are to the group centres. If the UGH receives the request, it will execute the instruction according to the list of parameters attached in the received message. After each time

TABLE 11

List of instructions provided by UPM

| Instructions | Request ID | Parameters | Description |
| --- | --- | --- | --- |
| Exist | 11 | Username | Check the existence of the user |
| Check | 12 | Username password | Check if the login username and password are correct, if so, load her profile |
| Create | 13 | Username | Create new user profile for the user |
| Delete | 14 | Username | Delete the user's profile |
| Update | 15 | List of properties and values | Update property value |
| Retrieve | 16 | List of properties | Retrieve property value |
| Reset | 17 | List of properties | Reset property value to be default |
| retrieveAll | 18 | Username | Retrieve all content about the user, mainly demographic information |
| addValue | 22 | List of properties and values | Insert a set of values for their corresponding properties |
| checkValue | 23 | List of properties and values | Check the validity of the value set for their properties |
| getLastSessionDate | 24 | Username, sessionID | Get the date of the user's last session | that the UGH regroups users, it will trigger the Association Miner (AM) to start mining association rules for each group. Group information will not be updated until the association rules are rediscovered.

The UGH reads the RDF description for group model and creates a database for the group model. It is responsible for creating and maintaining groups of users that can be clustered based on their interests or behavior. A new user will be assigned or an older user with updated states will be reassigned into a group based on how close they are to the group centres. Other members in the same group may provide recommendation to the user. The UGH has two components: the Usage Group Miner (UGM) and the Group Matcher ((GM). The UGH groups users together through the UGM and assigns a user into an existing group through the GM based on the evaluation of the user's distance from the groups' centres.

The UGM is responsible for grouping existing users together according to their interest in different predefined categories. The user's interests can be represented by the number ok items (for example, news items) in each category. Moreover, the earlier the item has been read, the less weight it will have in the category that the item belongs to because the user's interest might change over time. A new clustering technique called K-means+algorithm is used in the implementation of the UGM. K-means+algorithm was developed based on the K-means algorithm. The number of user groups will be generated by the UCM. As explained earlier, a user's interests are represented by a vector of which each element is the number of items that the user has read in each category. The GM determines how close the user is to each group centre by calculating the Euclidean distance between the vector of the user's interest and the vector of each group centre, which is the mean of all users' interest vectors in the group. Finally, the user will be assigned to the group whose centre is the closest to the user.

The communications between the UGH and the SE2CT interface is same as described previously. This section provides the reader with the description of the purpose and responsibility of the UGH, the introduction of the communications between the UGH and the AM, the representation of the group model, the description of underlying techniques used for the implementation of the UGH, the description of the K-means-clustering algorithm applied in the implementation, the summary of functions, and how to run the UGH. This provides an overview of the role of the UGH in the whole framework and enables understanding of the functionality of the UGH and techniques used for implementation.

Communications between UGH and AM

After each time that the UGH finishes the regrouping process, it will communicate with the AM to trigger the AM to start mining association rules for each group. Group information will not be updated until the association rules are rediscovered. The communications between the UGH and the AM is illustrated in FIG. 7. After finishing the grouping process, the UGH sends the message A to the AM. This message includes all users' group information. Once the AM receives the message A, it starts mining association rules for each group according to the group information provided by the UGH. Once the AM finishes the mining process, it updates the database and sends message B to the UGH to tell it to update the database. The Usage Group Handler needs to pass users' group information to the Association Miner through the message A. However, the packet sent from the UGH has size limitations. The users' group information should be split into several packets and received by the Association Miner.

Communication between UGH and SE2CT

As shown in FIG. 8, the UGH communicates with the Synthesis Engine (SE) frequently through the interface between the SE and conceptual tasks (SE2CT). It accepts requests From the SE2CT which are relayed from the SE and generate responses which will later be relayed to the SE through the SE2CT. The requests may be assigning a new user into an existing group. The communication between the SE, the SE2CT, and the UGF is through the UDP protocol. The format of packets received from the SE2CT and the packets that will be sent from the UGH to SE2CT was described previously.

Representation of Group Model

Group Model is described as the schemas in intermediate format for describing concepts and relationships existing in the application (in this case, mainly between groups or within groups' properties). The group model description includes the domain-specific group model vocabulary, the application-specific group model, and the default group profile. The group model is described by using the Resource Description Framework (RDF) serialized in XML.

Groups represent clusters of users who have properties in common. They are represented by their centres (results from clustering process). Centres are essentially the set of average values for some features within groups. Users will be classified into a group according to how close they are to the centres of the groups. Each group is identified by a unique name (group ID). The group model description includes the Group Model Vocabulary (GMV) and the description for application-specific Group Model with default group profile. The GMV is domain dependent but application independent. Different kinds of GMVs for their corresponding domain can be specified in the system and will later be used to define the application-specific group model with default group profile. The GMV contains description of concepts and relationships for all (as complete as possible) group properties in a specific domain (for example, the E-news domain). Group properties are described. Property name and its value range are specified as well. As shown in FIG. 9, defined concepts in the GMV, for example, Group Model class containing properties of groupID, groupPopu (group population), and the value range for groupPopu is an integer number. The GMV will be used for defining the application-specific group model and default group profile. For each application, an application-specific group model will be defined based on the predefined GMV, as shown in FIG. 10. A set of appropriate group properties will be selected to describe the group model according to the needs of the application. The default group profile will be specified as well. For instance, default value for groupPopu may set to be zero. The selected group properties and their relationships will be interpreted by the UGH and used for constructing a database structure to store group profiles and the predefined default group profile. Groups are generated through the mining process done by the UGH.

Service Provided by UGH

The UGH provides the service of updating users' group information. A new user can be assigned and an old user (can be reassigned to an existing group. Information on the service provided is presented in Table 12.

TABLE 12

The instructions provided by UGH

| Instruction | Command ID | Parameters | Description |
| --- | --- | --- | --- |
| groupMatch | 18 | Username | Update user's group information |

Description of Main Classes

The class diagram for the UGH is shown in FIG. 11. A description of some main classes follows:

Class Name: CTugh

This class registers the UGH to the SE2CT first, and then launches a thread for accepting requests sent to it. This class also defines the global variables for the database connection and the IP address and port number for the SE2CT. It specifies the server port for the UGH as well.

Class Name: CTugHandler

This class initializes the UGH, including creating a vector to store the group model structure in memory, creating database tables for the group model, and clustering the existing users and updating their group information. Some other variable values are also initialized including the number of existing users, and the number of new users. This class also accepts the requests from the SE2CT and starts a new Reply thread to handle the request.

Class Name: Reply

This class interprets the request and reads the request ID. The request ID will be used for determining which service should be used for handling the request. The generated response from the service will be sent back to the SE2CT.

Class Name: GroupHandler

This class launches a clustering thread to cluster users into groups. After each time that it regroups users together, it sends the AM a message to start mining association rules for each group. This class also updates group information after association rules are rediscovered.

Class Name: GMDesc

This class interprets the RDF description for the group model and default group profile. It constructs database tables according to the structure of the group and inserts default group profile. It also creates a vector to store the structure of the group model.

K-means+Algorithm

A new clustering technique called K-means+algorithm (shown in FIG. 12) is imported into the UGH for the purpose of grouping. The K-means+algorithm was developed based on the famous K-means algorithm [Guan et al., 2003a, Guan et al., 2003b]. In K-means+, three additional processes are introduced: the process of eliminating degeneracy, the process of splitting clusters with outliers, and the process of linking close clusters.

Specifically, the K-means+algorithm has a splitting procedure that removes outliers from existing clusters to form new clusters. An outlier is an object that is far from the majority of the objects in a cluster. As shown in FIG. 13, the centre of the cluster X is represented by the object c. The distance d between c and one of the members of the cluster, p. is greater than a threshold. The object p is deemed an outlier. The outliers of the cluster X are formed as a news cluster Y, as shown in FIG. 14. The K-means+algorithm also has a linking procedure. Some adjacent clusters may be linked to form a larger cluster if they are close enough. The centres of linked clusters are intact after linking; therefore, the newly formed clusters are multi-centred, and they can be in arbitrary shapes, such as a spatial chain.

As a result the number of clusters can be automatically adjusted according to the distribution and density of the data. More specifically, different from K-means, of which the number of clusters (k) remains fixed, K-means+ adjusts the value of k autonomously by exploiting the statistical nature of the data. Additionally, K-means+ also overcomes the shortcoming of degeneracy by deleting empty clusters. Compared with K-means, K-means+ uses the multi-centred clusters to obtain better performances. Overall, a number of user clusters will be generated by K-means+algorithm.

Association Miner

The Association Miner (AM) is an independent system component. It is responsible for providing recommendations to the user when she is reading a news item according to the association relationship between the current news item and other news items discovered by the mining process. It mines the usage data (user's navigation history, for example), generates association rules according to the usage data, and provides recommendations according to the discovered association rules and the user's current visiting news item. User's visiting history is made up of visited items in all previous sessions. The association rule here indicates, given a particular item read by users in a group, which other items the users have also read. The Apriori algorithm, an unsupervised learning algorithm, has been implemented to mine the rules. The support and confidence values of the association rules must be ranked based on a measure that is calculated from the support and the confidence values. Moreover, some popular items might also be recommended if the number of qualified items for recommendation is not enough.

Cooperation between UGH and AM

The AM recommends to users items that strongly relate to their current reading item. It makes use of the results from the UGH. The cooperation of both the AM and the UGH is shown in FIG. 15.

Association rules are discovered by the AM from visiting history performed by the users in the same group. Groups are generated by the UGH according to users' interests in each category. Users' interests in each category are represented by their navigation history, which is the set of items in the category they have read so far. What the UGH does is to cluster users who have similar interests together as a group. The used clustering algorithm is K-means+algorithm. User's navigation in each session will be recorded too. It is a sequence of items that they read in their session. The item sequences read by users in the same group in all of the sessions will be mined by the AM. One of functions of the AM is to discover association rules among the item sequences.

Communication between AM and SE2CT

As shown in FIG. 16, the AM communicates with the Synthesis Engine (SE) frequently through the interface between the SE and conceptual tasks (SE2CT). It accepts requests from the SE2CT, which are relayed from the SE and generate responses that will later be relayed to the SE through the SE2CT. The requests may be asking for recommendations for certain news. The communication between the SE, the SE2CT, and the AM is through the UDP protocol. The format of packets received from the SE2CT and packets that will be sent from the AM to SE2CT was described previously.

The association rule model is described as the schemas in intermediate format for describing concepts and relationships existing in the application (in this case, association rule). The association rule model description includes the domain independent association rule model vocabulary, the application-specific association rule model, and the default association rule. The association rule model is described by using the Resource Description Framework (RDF) serialized in XML.

The association rule model description includes the Association Rule Model Vocabulary (ARMV) and the description for application-specific association rule model with default association rule. The ARMV is domain independent. It contains description of concepts and relationships for all possible association rule properties. Association rule properties are described. Property name and its value range are specified as well. Defined concepts in the ARMV include, for example, AssociationRule class containing properties of groupID, priority (importance of the association rule), and the value range for groupID, which is an integer number. The ARMV will be used for defining the application-specific association rule model and default association rule. For each application, an application-specific association rule model will be defined based on the predefined ARMV. A set of appropriate association rule properties will be selected to describe the association rule model according to the needs of the application. The default association rule will be specified as well. For instance, the default value for priority may set to be zero. The selected association rule properties and their relationships will be interpreted by the AM and used for constructing a database structure to store association rules and the predefined default association rule. Association rules are generated through the mining process done by the AM.

Service Provided by AM

Information on the services provided by the AM is summarized in Table 13.

TABLE 13

The instruction provided by AM

| Instructions | Request ID | Parameter | Description |
| --- | --- | --- | --- |
| Recommend | 20 | userID, visitingNews, num | Recommend news associated with the current news based on visiting history of users in the same group |

Description of Main Classes

The class diagram for the AM is shown in FIG. 17. Descriptions of some main classes will be provided as well.

Class Name: CTam

This class registers the Association Miner to the SE through SE2CT first, and then launches a thread for accepting requests sent to it. This class also defines the global variables for the database connection and the IP address and port number for the SE2CT. It specifies the server port for the Association Miner as well.

Class Name: CTassocMiner

This class initializes the Association Miner, including creating a vector to store the association rule model structure in memory, creating database tables for the association rule model, launching a thread for mining association rules from the users' visiting history, and launching another thread for updating users' visiting history (delete the old history which is no longer useful). This thread waits for the message from the Usage Group Handler, and then mines association rules for every new group. This class also accepts the requests from the SE2CT and starts a new Reply thread to handle the requests Class Name: Reply This class interprets the request and reads the request ID. The request ID will determine which service should be used for handling the request. The generated response from the service will be sent back to the SE2CT.

Class Name: AssociationMiner

This class continuously collects users' visiting history from each group. It then mines association rules from the history. After the association rules are rediscovered, it sends the Usage Group Handler a message to ask it to update the groups' information in the database. It also provides a function to provide recommendation to user.

Class Name: ARDesc

This class interprets the RDF description for the association rule model and default association rule. It constructs database tables according to the structure of the association rule and inserts default association rules. It also creates a vector to store the structure of the association rule model.

Class Name: Mining

This class implements the Apriori algorithm to provide the association rule mining function. It also finds out the most popular visited news.

Algorithms

Two algorithms have been applied in the AM. One is the Apriori algorithm used for association rule mining. Another one is the recommendation algorithm used for providing recommendations to a user according to her current visiting news. Detailed explanations for each algorithm are provided below.

Apriori Algorithm

Association rules are generated by applying the unsupervised algorithm, the Apriori algorithm. First, support of itemsets should be found. The algorithm proceeds to find support of itemsets by: a) finding all single items whose frequency is above minimum support; b) for all supported single items, finding all pairs whose frequency is above minimum support; c) for all supported pairs, finding all triples whose frequency is above minimum support; and so on, until no itemset can be found.

The guiding principle is that every subset of a frequent itemset is also frequent. This principle can be used to throw away many candidate sets. Also, this principle is used for building the process of the Apriori algorithm, which means that every larger candidate itemset must be built on the itemsets that have frequency over minimum support. Based on this process, the Apriori algorithm can be written as in FIG. 18 [Joshi and Kumar, 1999].

This algorithm first counts frequency of each single item to generate the set of frequent 1-itemsets (denoted $L_1$). Next $L_1$ is used to find $L_2$, the set of frequent 2-itemsets, which is used to find $L_3$, and so on. To generate the large itemset, the candidate itemsets whose frequency is below minimum support should be thrown away. This procedure will end when no itemset with frequency above minimum support can be found. The resulting itemset will be the union of all the satisfied itemsets. Two sub-functions are introduces in the Apriori algorithm, Apriori_generate and subset.

The Apriori_generate function takes as input of a set of all itemsets ($L_i$) and returns a set of itemsets ($L_{i+1}$) where each itemset contains one more item. To achieve this goal, the Apriori_generate function has two steps: one is the join step and another is the prune step. The join step joins all the sets that contain first k-2 same items. The prune step will delete the itemset where at least one subset is not in the input itemset. The algorithm of Apriori_generate function is shown in FIG. 19.

The subset function efficiently determines whether the candidates are contained in a given transaction. It is used for counting the support of the candidates.

All the work introduced above is to find the largest set that contain all the itemsets whose support is larger than the minimum support. The next step is to generate association rules from all those itemsets. For each itemsets 1 that contains more than one item, all non-empty subsets of it should be found first. For every such subset x, a rule of x->(1-x) can be generated if the ratio of I's support to x's support is over minimum confidence. This idea is based on the relationship between support and confidence, which is introduced in the definition of association rules. This idea can be improved in a depth-first fashion based on the property of frequent itemsets. Because the support of any subset x' of x must be as large as the support of x, the confidence of the rule x'->(I-x') cannot be more than the confidence of x->(I-x). The simple algorithm following this idea from Agrawal and Srikant (1994) is shown in FIG. 19.

By thinking of this idea in the opposite way, a faster algorithm can be discovered. The revised idea is that if a rule (1-x)-x holds, all rules of the form (I-x')->x' must also hold. The faster algorithm following this idea is shown in FIG. 20.

This algorithm first generates all rules with frequent single item. Then, all pairs in a rule are generated by using the consequence of those single item rules and the function Apriori_generate Recommendation Algorithm The AM recommends to users news stories strongly relating to the news stories they are currently reading. Association rules are discovered by the AM from visiting history performed by users in the same group. Groups are generated by the UGH according to users' interests in each news category. The cooperation between the AM and the UGH was shown in FIG. 15 and the recommendation algorithm is shown as follows:

28. In each group the Miner mines visiting history performed by the users in the group to discover association rules through the Apriori algorithm.

29. In each group the Miner also finds out the 6 most popularly visited news stories from all users' visiting history.

30. If the number of the most popularly visited news stories is no more than 6 (this case happens when the system starts or there are not many user visits), some latest news stories should be added.

31. The Recommender finds out related news stories with the current news story being read from discovered association rules.

32. If the number of the associated news stories is not enough for what has been requested (no more than 6), the Recommender will add the rest from the popular news found in the second and third steps.

The Front Controller (User Front-End)

The User Front-End (UFE) component is the initial point of contact for handling HTTP requests. This front controller provides a centralized entry point that controls and manages Web request handling from various clients. It is designed based on the core J2EE Front Controller design pattern which well justifies the use of such a centralized point of access.

The UFE basically transforms a Web request to a synthesis request and sends it to the synthesis engine. The response of the synthesis engine is retrieved and stored, so that it is sent back to the browser upon its request. Hence, it creates a level of abstraction between the Web tier and the adaptation server. It also keeps track of users' sessions both for handheld devices and desktop PCs. It also assigns user IDs to the users of the system, the first time they connect to the system.

Component Communication

The UFE converts an HTTP request to a synthesis request and sends it to the Synthesis Engine (SE), then waits for the response. The communication protocol between UFE and SE is as follows. Synthesis Request is a UDP packet which has the following format (Table 14):

TABLE 14

Synthesis request format

| 4 bytes | 1 byte | 6 bytes | 1 byte | N bytes | N bytes |
|---|---|---|---|---|---|
| Client IP | Browser Type | Session ID string | User ID Size | User ID String | Request String |

The client IP is in the big-endian byte order. The Browser Type indicates the type of the browser the user is using and may be 0 (representing a client with WML capabilities) or I (a regular browser). Session ID is a 6-byte integer which represents the current session. User ID Size is the size of the User ID string, which follows in the packet. Request string is basically the Web address of the application +"#"+Concept+ "T"+Parameters. For example:

http://machine:8080/sample#main-page?some-parameter

Synthesis Response is a sequence of UDP packets, containing the main markup code, as well as each individual component inside the page. The format of each response packet is as follows (Table 15):

TABLE 15

Synthesis response format

| 2 bytes | N byte | 1 byte | 1 byte | N bytes | N bytes |
|---|---|---|---|---|---|
| URL size | URL | Flag | Type size | Type | Data |

URL is the unique identifier for the component, and URL size determines the size of it. Flag is a byte indicating if there are more components coming (1) or not (0). Type determines the content type of the component and the Type Size specifies the size of this string. Data is the actual component data.

Implementation

J2EE Web-Tier Technology

In a J2EE application, the Web tier usually manages the interaction between Web clients and the application's business logic. Some of the main functions that the Web tier typically performs in a J2EE application are:

Generates dynamic content
Maintains state
Supports multiple and future client types Several mechanisms were developed to allow Web servers to generate content on demand, all of which can be thought of as Web server extensions. The earliest standard server extension mechanism was the Common Gateway Interface (CGI), which defines a type of stand-alone executable program used by a server to produce dynamic content. CGI has performance limitations, because for each HTTP request a new process is launched to process that request. CGI is also a simple interface that offers no portable support for high-level system services, such as load balancing, scalability, high availability, security, state maintenance, and resource management, making scalable CGI solutions difficult to develop and maintain.

Web-tier technologies in the J2EE platform provide the benefits of server-side scripting, using compiled Java classes in a standardized, secure, and vendor-neutral environment. A Web application is a collection of Web-tier components, content, and configuration information, which operates as a single functional unit.

The run-time support environment for a Web application is called a Web container. The platform specification defines a contract between the Web container and each Web component, defining the component's lifecycle, the behavior the component must implement, and the services that the server must provide to the component. The platform specification also defines two types of Web component technologies: Java Servlets and JavaServer Pages™ (JSP pages) technology.

A servlet is a Java class that extends a J2EE server, producing dynamic content in response to requests from the server. The server passes service requests to the servlet through the standard interface javax.servlet, which every servlet must implement.

A J2EE Web application runs inside a J2EE server's Web container. The container manages each component's lifecycle, dispatches service requests to application components, and provides standard interfaces to context data such as session state and information about the current request.

The User Front End (UFE)

The UFE has been designed based on the J2EE Front Controller design pattern, which suggests a centralized access point to the application. In this way, all the requests to the system, from all kinds of devices and users, arrive at one point, which provides the possibility to centralize services such as security (authentication, authorization). The main class of the UFE is a Java Servlet, which acts as the front controller of the system (FIG. 21).

Controller Servlet

All the HTTP requests are first handled by the Controller Servlet. The Controller constructs a synthesis request for each received HTTP request and sends it to the SE. Then, it waits for the response of the SE. After getting the result, the Controller writes the binary or text output to the browser.

The Controller recognizes the user agent type (WAP browser or not) from the accept header of each request. If either of "wml" or "wbmp" strings is found in the accept header, the browser is assumed to be a WAP browser. The type of the browser is later sent to the SE. It is also used for session management where different approaches are required for handheld devices.

The Controller also manages the Component Cache, and if a component is requested by the browser and it exists in the Cache, the Controller won't send the request to ST; and just retrieves the component from the Cache and sends it back to the browser. The Controller handles both GET and POST HTTP requests.

The Controller uses UDP packets to package and send a synthesis request to the SE.

Component Cache

When a response is generated by SE, it may contain both HTML (or WML) code and the contained components such as images. The browser will send a separate request for each individual component in a page. Hence, in order to avoid many unnecessary synthesis requests to be sent to SE, the SE sends back all of the contained components in a generated page when the page is sent back.

However, these components cannot be sent back until the browser requests them. Therefore, a temporary repository is required in the Controller in which the components of a response are stored to be retrieved by the Controller upon browser request. This temporary repository is called Component Cache. It only keeps the components until the next concept request (in contrast to a component request).

The Cache Java class abstracts such a repository and provides methods to insert and retries the the components as well as clears the repository. This component uses a hash table to store the components. The URL of each component is used as the key.

The CacheElement Java class encapsulates a component and contains the URL of the component as well as the type information and the binary data.

User W Generation

The first time a user connects to the system, a random user id is generated and stored both in the database and in the user's computer. Cookies are used to store this user id. When a request arrives the Controller first tries to retrieve the user id information from the client. If there is no user id, it generates one and stores it. The user id is sent to SE along with each request. The user id persists as long as the user doesn't delete the Cookies or change her computer.

Most handheld devices do not support Cookies; hence, there is no guaranteed way of tracking users for these devices.

Session Management

Java Servlet API provides some facilities for session tacking; however, since there are some limitations for hand-held devices, a session tracking mechanism was implemented.

URL rewriting is used to keep track of sessions. In this approach, the URL references in a response are rewritten to embed session information so that after following interactions (hence requests) the related session can be retrieved. The Session Tracker Java class provides facilities to embed and retrieve session information into the URLs. Currently, a generated session id is encoded into the URLs according to the following pattern:

http://machine-name:port/application/sidXXXXXsid-Concept

The "sid"s embrace the session id, which is identified by 'X's here. The Concept can be anything from an image name or any abstract entity. The Controller adds the session id to the URLs when it sends a response to the browser and removes it from them when a request arrives. Session Cracker stores a Session object for each session, and if a request arrives for the first time, a Session object is created and stored in a table.

Although sessions for non-handheld devices could be tracked by the same mechanism, Servlet session management mechanism is used.

Device Profile Communication

UFE tries to retrieve the user agent profile (UAProf) of any device that connects to the system. Then, it sends the information inside the profile to the Handheld Profile Manager conceptual task. If the device does not have a profile, a default profile will be used. Mobile devices have their own profiles.

UFE uses an open-source library called DELI (Delivery Context Library) developed by Hewlett-Packard. DELI provides the necessary components for a server to retrieve device profile information from a Web request. It also provides a repository of different kinds of browsers' profiles.

User IP Locator Conceptual Task

In Web Applications, it is sometimes desirable to know the geographical information of the user connecting to the system. This information can be used for online card fraud detection, geographical access control, content and advertisement targeting, digital rights management, criminal tracking, stolen/shared ID detection, and traffic management.

The importance of locating where users are connecting from becomes more evident in adaptive Web applications in which the ultimate goal, besides functional requirements, is to provide a personalized view of the information and services to the user based on the current context information. This context information may include the geographical location of the user. For instance, in an adaptive news web site, it is desirable to provide each user with the most related news items at the top of the page. One criterion to find related news items is the location of the user. Hence, a user connecting from location X will see the news items related to location X at the top, and a user connecting from location Y will see news items related to location Y at the top of the page.

User IP Locator conceptual task provides a service through which the location code for an IP address can be retrieved.

Component Communication

The format of the UDP request for a location query should be as follows (Table 16):

TABLE 16

| IPLocator request packet format | | |
| --- | --- | --- |
| 2 bytes | 1 byte | N bytes |
| Sequence number | Request id | IP String |

And here is the format of the response returned by the conceptual task should be as follows (Table 17):

TABLE 17

| IPLocator response packet format | |
| --- | --- |
| 2 bytes | N bytes |
| Sequence number | Location code String |

The byte order of the sequence number is big-endian.

Implementation

In this section, we specify the IP Locator conceptual task from a technical point of view.

IP Locator is an active component, which can listen to many simultaneous requests and respond to them efficiently. It has three classes: IPLocator, Task, and Locator. CTLocator accepts requests and assigns Task object to them, and Task object uses locator components to retrieve location information.

CTLocator Class

This class is the main Java class, and the entry point of the conceptual task. At initialization time, it accepts command-line configuration data, which determine various parameters such as the IP and port address of the conceptual task registry, the task id, and database connection information.

Once registered, the CTLocator stops and waits for network requests at its assigned port. When a new request arrives, CTLocator receives the request and launches a new Task to serve the request and blocks again, waiting for the next request.

CTLocator uses UDP protocol for network communication. In this way, the communication is connectionless and no state information is preserved. Each request is sent by a UDP packet and is served by the CTLocator, and after returning the information, the connection is closed.

Task Class

This class encapsulates a thread, which is responsible for responding to an IP location request. Task threads decode the IP location requests and extract the IP address for which the location is requested. Then, the location of the IP is queried using a Locator object. Once the location is retrieved, it is encoded into a UDP packet and sent back to the requesting client.

Locator Class

This class is basically the component that connects to the IP location information database and queries for the location of an IP. Currently, the location is an integer representing the code of the area. Later, other information such as zip code can be simply retrieved. This class abstracts the details of the back-end database from the Task thread. This is crucial since the interface to the IP database may not necessarily be a database connection but a Web service connection. Using Locator, supporting different data sources is a matter of adding new methods or overriding existing ones in the Locator class Currently, Locator class uses JDBC connection protocol to access the IP location database located in a remote MySQL database.

Hand-held Profile Manager (HPM) Conceptual Task

The number of handheld devices, such as smart phones, personal digital assistants, and other gadgets, is growing dramatically. One of the expected functionalities of modern handheld devices is Web browsing. However, various issues arise when trying to provide handheld users with Web access features. In contrast to desktop PCs, which have all the necessary means to support rich Web features, handheld devices suffer from hardware (and, as a consequence, software) limitations, some of which are small screen size, limited processing power, small memory, etc. The need for Web support for handheld devices on the one hand, and the existing device limitations on the on the other hand, have pushed researchers and developers to develop new technologies to enable Web access for handheld devices. Different protocols and languages have been developed during recent years to fulfil Web access requirements for handhelds. As handheld hardware technology evolves, software technologies are improved and new facilities are added.

Currently, handheld devices are getting nearer to desktop computers in the sense of their Web browsing technologies. The presentation language of the recent WAP 2.0 protocol is XHTML, which is the same for both handhelds and desktop computers. The screens of the handhelds, although small, are becoming closer and closer to the desktops, regarding their resolution and bit-depth. However, there are still differences which make more sophisticated technologies for Web browsing indispensable.

HPM is responsible for keeping track of the characteristics of mobile devices that connect to the system. The device characteristics are extracted from the UAProf profile provided by the device manufacturer. If the device does not support this protocol, then the default profiles will be used.

The device profiles are captured by UFE using DELI library. UFE then extracts the attribute value pairs and sends then over UDP to HPM. HPM receives the attribute-value pairs and the device id, and creates the necessary records in the database. Then, SE can inquire about a specific device's attributes upon which HPM provides the inquired information.

Component Communication

The format of the UDP requests to HPM should be as follows (Table 18):

TABLE 18

| HPM request packet format 1 | | |
| --- | --- | --- |
| 2 bytes | 1 byte | N bytes |
| Sequence number | Request id | Parameters string separated by '#' |

Also, the format of the response returned by the conceptual task for SET_ATTR_VAL, SET ALL, and IS_ATTR_SUPPORTED is as follows (Table 19):

TABLE 19

HPM request packet format 2

| 2 bytes | 1 byte |
|---|---|
| Sequence number | Return code |

For other requests, format is as specified as in Table 20.

TABLE 20

HPM response packet format

| 2 bytes | N bytes |
|---|---|
| Sequence number | String containing the value, or attrib-val pairs, separated by '#' |

The byte order of the sequence number is big-endian.

Implementation

Device Profiles: a Rich Resource for Adaptive Web

The increasing number of wireless devices and the broad range of their capabilities create a challenge for mobile application developers, since multiple versions of the same content should be provided and still there is no guarantee that a device receives the appropriate content according to its features. The solution is to inquire device capabilities from the device itself so that an application can optimize the content on the basis of the stated capabilities of the device. This can not only reduce the amount of testing required, but also future proof the application to some degree. When a device that has not been previously tested with the application, and is used to access the application, it can present the content in an optimum way by interrogating the device's UA Profile.

The User Agent Profile profiles the user client, i.e., describes the capabilities of the device hardware, software, supported technologies, and its browser. This information is communicated in an XML document and covers the following attributes of the Device:

Hardware Platform, e.g., screen size, audio capability, color capability.

Software Platform, e.g., operating system, content types, etc.

Network Characteristics; e.g., GSM/GPRS capable, WLTS capable

Browser name and version; e.g., XHTML version, JavaScript Support

WAP Characteristics; e.g., WML version, deck size, OMA download

Plush Characteristics; e.g., Push content types, application.

The information is quite comprehensive (FIG. 22). The UAProf for the Nokia 6600 is over 10 k in size. Since it is not feasible for a device to send this information over the air, the profiles are stored on a publicly accessible repository so that all the device needs to do is to state the URL of its UAProf.

Once the device is connected to the system, the application uses the information in the HTTP header to retrieve the device's attributes and then uses this information to optimize the way that it presents to the user.

Another useful aspect of the UA Profile is that, as it is an XML document, it is human readable. This means that if developers want a detailed specification of a device, all they need to do is access that device's UA Profile Location of Major Vendor UAProfs Repositories such as Nokia. This also means that developers can perform testing for a device that they do not have, by emulating the device and pulling in the UA profile to see how their application behaves when confronted with that profile.

To create customized pages, developers can either use the UAProf architecture or manually pull the information out of the UAProf files, create their own database containing the information, and use the User Agent header to display the correct content. There is a UAProf profile repository at the following address: http://w3development.de/rdf/uaprof_repository//#realworld.

For a complete list of the supported attributes, refer to the UAProf Schema RDF file at:

http://www.openmobilealliaftce.org/tech/profiles/UAPROF/ccppschema-20021212_

Components

HPM DB_Creator is a standalone class that is responsible for creating the required database tables from the UAProf schema. This component receives the same command-line parameters as HPM. It then creates the following tables:

"hpm_attributes" table: name, type, description, category

"hpm dev attrib" table: device, attribute, value

"deviceids" table: id, name, mobile

DBManager class provides some general database methods to create databases and tables.

HPM DB class is a data object for HPM tables; that is, the conceptual task uses this class to interact with the created tables.

HPM Task is a class responsible for responding to a single request. In other words, HPM creates a task for each individual request. The task then uses HPM_DB to respond to the request.

HPM CT is the main class for HPM conceptual task. It initializes the component and waits for requests. Upon receiving a new request it launches an HPM_Task object and waits for other requests.

Concept Manager (CM) Conceptual Task

Synopsis

It is desirable, in adaptive Web systems, to model domain information in terms of domain concepts and their relationship. This model is called domain model or ontology.

No matter how this information is modelled, the framework needs an active component to manage this knowledge. Concept Manager (CM) is a conceptual task that keeps track of concept relationship knowledge and provides information for SE upon its request.

Component Communication

Table 21 and Table 22 show the formats of the UDP request to, and response from, CM conceptual task.

TABLE 21

CM request packet format

| 2 bytes | 1 byte | N bytes |
|---|---|---|
| Sequence number | Request id | Parameters string separated by '#' |

TABLE 22

CM response packet format

| 2 bytes | N bytes |
|---|---|
| Sequence number | String containing the result |

Implementation

Concept Manager makes extensive use of the LogicServer component provided by the Amzi Logic Server. The Logic- Server class provides methods to interact with a prolog logic base through prolog predicates.

Here are the classes implemented in the CM conceptual task:

ConceptManager

This is the main class of the component. The ConceptManager class receives requests through UDP protocol and launches Task object for them.

ConceptLogic

This class converts the rather high-level conceptual task commands to low-level prolog predicates that can be sent to logic base.

LEngine

This is a wrapper around LogicServer class. It offers methods for executing LogicServer commands Task This class is responsible for responding to an individual request using the ConceptLogic class. FIG. 23 shows the interaction between the CM classes.

In addition to the primitive Prolog predicates and other extended predicates provides by the Amzi library, the following predicates have been provided for concept management purposes and must be extended later for better functionality:

```
equals (X, Y): -
    X = Y.
new_concept (Type, Concept): -
    concept (Type), assert (concept_instance (Concept, Type)),
    attribute (Type, A,    _),    assert(attrib_ instance(Concept,
A, 'null'), fail.
Set_value(Concept, Attribute, Value): -
    Concept_ instance (Concept,    _),
    retract(attrib_ instance(Concept,
Attribute,    _)), assert (attrib_ instance(Concept, Attribute,
Value)).
get_ value (Concept, Attribute, Value): -
    concept_ instance (Concept,    _), attrib_ instance (Concept,
Attribute, Value).
sameName (Y, Y) : -
    concept_ instance (X, category),    concept_ instance (Y, category),
    attrib _instance (X, name, Z),    attrib_(Y, name, Z), X  \==
Y.
```

These are defined in the basePredicates.pro file.

Image Format Converter Component

Synopsis

In adaptive Web systems, in order to adapt the presentation aspects of information to the current context, it is sometimes necessary to change the format of the original information fragments. For instance, images corresponding to a piece of information may originally be stored with the highest quality and dimensions in the database. However, not all users use powerful PCs to access the system and some users may use mobile devices. Therefore, when generating content for a request, the target device characteristics should be taken into account (adaptation to device), and according to the capabilities of the device, the appropriate fragment format be selected and sent back.

There are generally two approaches to providing such an adaptive fragment generation. One simple but limited way is to store different information fragment formats (e.g., images) in the database and retrieve the appropriate one upon request. This approach is simple; however, the range of capabilities of the devices is so varied that it is practically impossible to cover all formats for a fragment. Even if possible, it requires a lot of space. Besides, the information fragments have to be statically known to the application and an offline process should create the difference formats of them.

The other approach is dynamic (online) conversion of fragments to the proper format based on the context information (device capabilities). In this approach, only one high-quality version of the fragment, which contains the highest detail, is stored in the database. Then, if the context information of a request indicates the need for a restricted format, a dynamic conversion takes place and a compliant-to-current-context format of the fragment is generated from the original fragment. This dynamic approach allows the system to generate virtually infinite number of formats based on the context information.

Image Converter is a component that offers the necessary API for dynamic image format conversion.

Implementation

There is only one class, ImageConverter, which encapsulates all the required functionality for converting images to different format, size, and quality. The Java Advanced Imaging API (JAI) and ImageIO library are used as the underlying imaging API. The JAI extends the Java platform by allowing sophisticated, high-performance image processing to be incorporated into Java programming language applications. ImageIO provides a pluggable architecture for new image formats and uses image data types based on the Java2D API.

JAI Basics

The Java Advanced Imaging API extends the Java 2 platform by allowing sophisticated, high performance image processing to be incorporated into Java applets and applications. It is a set of classes providing imaging functionality beyond that of Java 2D and the Java Foundation classes, though it is designed for compatibility with those APIs. This API implements a set of core image processing capabilities including image tiling, regions of interest, deferred execution and a set of core image processing operators, including many common points, area, and frequency domain operators.

The Java Advanced Imaging API is intended to meet the needs of technical (medical, seismological, remote sensing, etc.) as well as commercial imaging (such as document production and photography).

Digital images, specifically digital color images, come in several different forms. The form is often dictated by the means by which the image was acquired or by the image's intended use. One of the more basic types of color image is RGB, for the three primary colors (red, green, and blue). Printed color images are based on a subtractive color process in which cyan, magenta, and yellow (CMY) dyes are deposited onto paper. JAI uses three primary classes for the management of color:

ColorModel: describes a particular way that pixel values are mapped to colors. A ColorModel is typically associated with an Image or Buffered image and provides the information necessary to correctly interpret pixel values. ColorModel is defined in the java.awt.image package.

ColorSpace: represents a system for measuring colors, typically using three separate values or components. The ColorSpace class contains methods for converting between the original color space and one of two standard color spaces, CIEXYZ and RGB. ColorSpace is defined in the java.awt.color package.

A ColorModel is used to interpret pixel data in an image. This includes:

Mapping components in the bands of an image to components of a particular color space Extracting pixel components from packed pixel data Retrieving multiple components from a single band using masks Converting pixel data through a lookup table To determine the color value of a particular pixel in an image, you need to know how the color information is encoded in each pixel. The ColorModel associated with an image encapsulates the data and methods necessary for translating a pixel value to and from its constituent color components. JAI supports five color models:

DirectColorModel: works with pixel values that represent RGB color and alpha information as separate samples and that pack all samples for a single pixel into a single int, short, or byte quantity. This class can be used only with ColorSpaces of type ColorSpace.TYPE_RGB.

IndexColorModel—works with pixel values consisting of a single sample that is an index into a fixed colormap in the default sRGB ColorSpace. The colormap specifies red, green, blue, and optional alpha components corresponding to each index.

ComponentColorModel—can handle an arbitrary ColorSpace and an array of color components to match the ColorSpace. This model can be used to represent most color models on most types of GraphicsDevices.

PackedColorModel—a base class for models that represent pixel values in which the color components are embedded directly in the bits of an integer pixel. A PackedColorModel stores the packing information that describes how color and alpha components are extracted from the channel. The DirectColorModel is a PackedColorModel.

FloatDoubleColorModel—works with pixel values that represent color and alpha information as separate samples, using float or double elements.

The ColorSpace class represents a system for measuring colors, typically using three or more separate numeric values. For example, RGB and CMYK are color spaces. A ColorSpace object serves as a color space tag that identifies the specific color space of a Color object or, through a ColorModel object, of an Image, BufferedImage, or GraphicsConfiguration.

ColorSpace provides methods that transform Colors in a specific color space to and from sRGB and to and from a well-defined CIEXYZ color space. All ColorSpace objects must be able to map a color from the represented color space into sRGB and transform a sRGB color into the represented color space.

Converting Images to Grayscale

In order to convert a color image to a grayscale image, depending on the sample model of the source image, different strategies should be selected. The sample model can determine how many bands (channels) there are in one sample of image data. For instance, a 24-bit RGB image contains 3 bands, and a 32-bit ARGB contains 4 bands, one of which is alpha channel. Besides, the image can be a 16-bit image, still with RGB data.

In RGB images all the bands (except alpha) contribute to the gray-scale image information. Hence, all the bands should be taken into account.

We use matrix multiplication to transform a multi-band image to a single band grayscale image. In JAI, the "BandCombine" operation performs a linear color conversion between color spaces. The "BandCombine" operation computes a set of arbitrary linear combinations of the bands of a source image, using a specified matrix. The matrix must have dimension (# of source bands plus one) by (# of desired destination bands).

The NTSC standard for converting RGB data to luminance is: Luminance $$Luminance = (.114)*R + (.587)*G + (.299)*B$$

Based on this formula, and considering the desired single-band destination image, a 1×4 matrix is constructed

[.114 .587 .299 0]

This matrix is applied to the image through the "BandCombine" operation. Since the source image can have different bands, we consider different matrices:

Converting Grayscale Image to Binary Image

In order to convert a grayscale image to a binary image an "IndexColorModel" is set up to contain only two colors, black and white. Then an "orderedeither" operation is applied to the source image, converting it to a binary image.

Scaling

For scaling, the "scale" operation of the JAI is used. For WBMP conversion, if the dimensions of the source image are larger than the default threshold (96 for height, and 48 for width), the necessary adjustment to the scaling operation is applied.

AWL Compiler

Lexical Analysis and Parsing

AWL Compiler uses JavaCC to generate the lexical analyzer and the parser. JavaCC accepts a special notation as a language syntax specifier and generates a Java class that accepts programs in the specified language. The EBNF syntax of AWL is converted to the input format that JavaCC accepts (LAWS.jj file). However, a parser that only accepts input programs is of no use. The ultimate goal of the parser is to generate the abstract syntax tree of the input program. As explained in the previous section, several classes are designed to represent the semantics of the language production rules. These classes are used to enhance the AWL Compiler's parser to generate an abstract tree, which represents the input program. Later phases of the compiler use the generated abstract tree as input. The generated tree only has useful information about the program and excludes the syntactic sugar (elements of the language that added for readability and beauty of programs).

The LAWSParser class accepts a file stream (input program) and generates the abstract syntax tree of the program using the semantic objects; it then returns a pointer to the root of the tree, which is a CT_AWS object. The semantic objects are defined based on the AWL syntax production rules. The semantics of a language is the meaning of the program elements and units, coded in the language. The meaning of language statements, expressions, and constructs can be used by compiler developers (to develop compilers for the language), or by programmers who want to program in the language.

The concepts of adaptive Web systems domain are used to explain the AWL semantics UML diagrams, which are part of the parser that reads programs in AWL, are presented as a formal notation for explaining what production rules in the syntax mean.

When an AWL parser reads a part of a program that corresponds to a production rule in the syntax, it creates an object to represent the left-hand side element in the production rule. This object keeps references to all the elements on the right-hand side of the production rule. Hence, at the end of parsing, the parser returns a tree whose root node represents the highest level element in the syntax, i.e. AWS. This tree holds the structure of the parsed program in terms of language syntax elements. This tree is referred to as the abstract syntax tree of the program.

However, the tree that is built in the above way is not only an abstract syntax tree, but also a semantic tree. In fact, the objects created for each intermediate node in the syntax tree (the intermediate nodes are those that are not leaf; in other words, they are left-hand side element of at least one production rule) have the meaning of the production embedded Hence, the class hierarchy of these semantic entities represents the semantics of the language.

FIG. 25 shows the class hierarchy representing a program in AWL. That is, when a program is parsed, the parser returns an object of the type <AWS>. <AWS> has methods and attributes for storing a program's meaning in the form of concepts (<CONCEPT>), relationships (<RELATIONSHIP>), presentations (<PRESENTATION>), adaptation modules (<ADAPTATION>), user model modules (<USERMODEL>), extended entities (<EXTENDED-ELIMENTS>), functions (<FUNCTIONS>), and finally, instantiation model (<INSTANCE-MODEL>). An AWL program is defined to contain a set of modules, each of which describes an aspect of the application. Concepts and relationships are used to model the domain, to which the application belongs (e.g., e-News or e-Learning). Presentation specifications describe how the information is presented to the user, using a hierarchical fragment structure. Adaptation modules abstract the adaptation strategies provisioned by the designer in the application. The <USERMODEL> specifies the structure and dynamics of the user model. Functions and extended entities are not essential parts of a program; however, they provide the means for a designer to make domain libraries that are very easy to use, hence the authors (who might not have general programming language expertise) can easily express the application through custom domain vocabulary extended by the designer. The instantiation module can be used for configurations and onetime initializations. Currently, it is not being used in the language, but is reserved for later language extension.

The presentation modifier (<PRESMODIFIER>) can be used to mark a presentation as a page or as the main presentation module of the system, which makes the presentation of the front page of the system (the first page the user sees when connecting the system). The attributes of a presentation define the information encapsulated and presented by the presentation. They can also be used as variables that hold helpful results during the information retrieval and computation. The items define the fragments inside a presentation. An item has a name and a type. The fragment type can be text, image, XHTML, or any user-defined presentation. An item list defines an array of fragments that have the same type and properties. The item lists can be vertical or horizontal in the presentation layout. The parameters that are passed to the item list can determine the size, ordering criteria, and so on (currently only size is supported). The item properties specify various format and style properties of the fragment, as well as layout and hypermedia relations, such as linksTo relation, that links a fragment to another presentation. The presentation can also have properties that specify margin, alignment, and header (if it is a page) information.

FIG. 27 shows the semantic hierarchy corresponding to the user model definition. In a program, there can be as many user model modules defined as possible; however, only one can be the main user model, which can be specified through the user model modifier (<USER-MODIFIER>). The user model consists of a set of attributes; the attributes can have both primitive types (string, realNumber, etc.) and userdefined structures. Besides, the attributes in user model can be defined as overlay attribute, meaning that there is not just one value associated with the attribute but a vector of values, each of which correspond to a concept in the domain. The userdefined structures (if any) are defined inside the user model. They are recursively defined as a set of attributes. In addition to static structure of user model, the behaviour of user model (how it is updated) needs to be specified too. Events are used to specify when and how the user model is updated. The event has a name and a parameter list, and a block of statements that can update attributes of user model. For instance, the event corresponding to a page visit is named visited and it takes one parameter: the name of the visited page.

FIG. 28 shows the class hierarchy corresponding to an adaptation module (<ADAPTATION>) which is composed of a set of target definitions (<ADPTARGETDEF>) and adaptation statements (<ADPADAPT>). Each adaptation target specifies a set of presentation items, which will be adapted through adaptation statements inside the module. A target has a name and a parameter list. The name is used in the adaptation statements to refer to the target set. The parameter list is not currently used. A target is recursively defined as the union or difference of other target sets (<ADPTARGETSET>). The recursion stops when set is a pattern string. The pattern string is used to easily and effectively select presentation elements based on their name, types, or containing presentation. For instance, if one wanted to define target allImages to be the set of all images in all the presentations, the target definition would be as follows:

target allImages: 'item *:image:

The wildcard character is used in its common sense, to mean any match. The type of the items is specified after ':' in the pattern string. If all the images inside Banner were to be selected, the following pattern can be used:

target banner-Images. 'item *:image in Banner'

Currently, the pattern expressions, though simple, are strong enough to hook into the presentation description for adaptation purposes; however, the pattern matcher can be customized to accept more sophisticated patters.

The adapt statements (<ADPADAPT>) are used inside an adaptation module to express the way the targets are adapted. The target of the adaptation is specified after the adapt keyword, and a list of parameters (not currently used) follows. Then, a block of statements will affect the targets. Although any sentence is syntactically allowed to be used inside the block, it is not semantically legal or meaningful to have certain statements. The <OPERATION> statements are specifically defined to be used within adaptation blocks. The operation statements along with the conditional statements (<IFSTATEMENT>) can define conditional or nonconditional adaptations. An operation starts with a '!' character, and has a name and a list of parameters. These operations are easily extendible. The adaptation properties are defined for later extension of adaptation model.

As FIG. 29 shows, concepts (<CONCEPT>) are composed of a set of attributes, which represent a domain notion, or rather a piece of information structure. Relationship declarations indicate what relationships exist between the concepts. FIG. 30 shows the relationships corresponding hierarchy. The relationship definition follows the predicate logic ideas in an object based approach. The relationship body consists of a set of clauses that are connected with logical OR. If any of the clauses is evaluated to be true, then the relationship holds. Each clause is a set of predicates connected with logical and operator. Predicates can be predefined, such as comparisons, or other relationship names, which are defined by the designer.

FIG. 31 shows the hierarchy of statements. A statement can be an assignment (<ASSIGNMENT>), an expression (<EXPR>), an operation (<OPERATION>), an instantiation (<INSTANTIATION>), a fact definition (<FACT>), a query (<QUERY>), or a conditional statement (<IFSTATEMENT>). An assignment simply evaluates an expression and assigns the result to an attribute. The expression hierarchy is shown in FIG. 32

A fact inserts a record into the system's knowledge base about a relationship between a set of (normally two) concepts. For instance, the prerequisite relationship between two course concepts x and y can be asserted into the system by .prerequisite(x, y), given that prerequisite relationship is declared to be a valid relationship between x and y concept types. On the other hand, queries inquire about existing knowledge through calling the relationships and passing parameters to them. If the relationship holds, then a value of true is returned.

After the abstract tree is generated, it has to be semantically processed and verified. Most of AWL Compiler's components have been developed following the visitor design pattern; each component that processes the tree is implemented as a visitor that accepts as input the abstract tree generated by the AWL parser. FIG. 33 shows some of the visitor classes implemented in AWL Compiler. All of the visitors extend the abstract LAWSVisitor class, which provides methods for visiting all the semantic objects generated by the parser. The simplest visitor is the LAWSPrint Visitor, which simply traverses the whole tree and prints the information inside the nodes.

Symbol Table Visitor

The symbol table keeps information about the program entities that are not part of the keyword set of the language, such as item and attribute names. FIG. 34 shows LAWSSymbolVisitor class, which is derived from LAWSVisitor class. The elements of the symbol table are of type Symbol, which have a symbol table embedded. This originates form the structure of AWL that allows some symbols to be defined inside other entities. Each symbol object has information about the name, type, address, and semantic object (generated by the parser). LAWSSymbolVisitor, provides these information for other compiler components in later phases.

Register Management

Synthesis Engine has a bank of registers that are used for storing information about the current user request and the current Web application. These registers are the only memory storage that compiler-generated systems can use to store information. Registers are mostly used for storing the results of information queries from Conceptual Tasks as well as intermediate results of expression evaluation. The attributes of each presentation are assigned a location in the register bank and the address is assigned to the corresponding symbol in the symbol table.

Weaver

Since the adaptation modules are expressed separately from the presentation descriptions, it is the compiler's responsibility to weave the adaptation into the presentation descriptions. This is accomplished by the Adaptation Manager (FIG. 35). Adaptation Manager uses a parser class to interpret the target pattern string used to specify adaptation targets. Then, the target item's semantic object is retrieved through the symbol table. For each adaptation affecting an item a constraint object is created, which encapsulates the necessary instructions and conditions that enforce the adaptation on the item.

Service Manager

Conceptual Tasks provide several services that can be used by applications using the framework. FIG. 36 shows a piece of code from a Web site description that calls a service from the UserProfile Manager Conceptual Task to check if a news item has been read by the user. As the picture shows, it is not very easy to make service calls; especially when there are a lot of them. In AWL, services can be called similar to a function call. For the service call in FIG. 36, for instance, the author can write:

call upm.checkValue(userID, 'newsID', news), where userID is a keyword, newsID is the attribute name whose value is being checked, and news is an attribute which is defined somewhere and is supposed to hold the news ID. AWL Compiler translates this code to the low-level code that is understandable by synthesis engine.

In order to translate the service calls in AWL programs to low-level RDF code, the compiler has to know the existing Conceptual Tasks and the services they offer as well as the parameters and return types. Service Manager (FIG. 37) manages the conceptual tasks and their services and provides necessary information for the compiler to translate the service calls in the programs to low-level RDF description.

Application Description Generator

FIG. 38 shows the heart of the compiler, that is, SDGenerator. This class is responsible for generating the final site description using the other components of the compiler such as register manager and expression evaluation code generator. SDRDFGenerator offers methods for creating RDF objects for framework entities. For expression code generation, each expression in the abstract tree is passed to ExprVisitor, which in turn generates an expression tree whose node are objects of type Expression and the root of the tree is an Expression. Expression class has a method called generatePostfixEval, which processes the expression tree and generates RDF code that will evaluate the expression at runtime.

FIG. 39 and FIG. 40 show a simple hello-world program and the output, respectively. Part of the generated code is shown in FIG. 41. In fact, the generated code is a RDF description based on which the underlying framework can build the application. The compiler uses the pre-defined vocabulary (http://ias.cs.unb.ca/mehran/SiteDescVocab) to describe various features of the application such as the contents of the items, their type, and their attributes. The elements' names in the generated description are compiler-generated; for instance, mainpageinit, in line 13, denotes the initialization section of the front page of the application, and Move262007846SEReg33, in line 1, is an instruction that assigns a value to an internal register. As FIG. 38 shows, UMGenerator is another visitor class that generates the user model in RDF format LogicBase Generator The concepts and relationships that are defined in an AWL program best fit a logic-based paradigm of programming. This comes from the fact that the concepts and relationships should be defined for later queries and inference. So, similar to the logic programming language paradigm, after providing rules, and facts in a domain, it is desirable to inquire about unknown predicates.

AWL Compiler translates concepts and relationships to Prolog predicates. These predicate, then, are read by a framework's component called Concept Manager, which is at logic base and provides runtime services for updating domain information modelled as concepts and relationships; besides, it provides facilities for querying the logic base Program Error-Checking and Verification FIG. 42 shows the hierarchy of verifier classes that accept the semantic object hierarchy (created by the parser) and verify it against language semantic rules. For instance, LAWSTypeChecker will check the expressions and statements to find out any type inconsistencies. Once it finds such inconsistencies, it creates a LAWSError object and at the end, reports all the errors.

Other verifiers check the programs for their soundness. LAWSLayoutVerifier builds a graph of all the placement relationship between items of a presentation and through executing an algorithm finds any inconsistencies between the items. For instance, if item x is said to be above item y, and item y is said to be at top, this is a violation and will be reported by the verifier. The algorithms and further information were discussed earlier in the Synthesis Process section.

The above-described embodiments of the present invention are intended to be examples only. Those of skill in the art may effect alterations, modifications, and variations to the particular embodiments without departing from the scope of the invention, which is set forth in the claims.

What is claimed is:

1. A processor-implemented process for dynamically generating browser-ready code comprising the steps of:
   (a) in response to a request for the browser-ready code, compiling an intermediate code description in a predefined language from a high level code description of a web page written in a domain dependent adaptive web language dependent on a domain of application and comprising one or more adaptive features, wherein the intermediate code description characterizes the adaptive features as a set of adaptive variables, and wherein the predefined language is a domain independent intermediate vocabulary format;
   (b) receiving the request at a synthesis engine;
   (c) the synthesis engine reading the intermediate code description to extract the set of adaptive variables associated with the web page;
   (d) the synthesis engine obtaining and storing one or more constraints associated with the request either from the request itself or from external data sources to serve as values for the set of adaptive variables, at least one of which constraints is a browser language from a class of browser languages supported by a runtime compiler associated with the synthesis engine; and
   (e) the synthesis engine compiling, by way of the runtime compiler, an instance of the browser-ready code from the intermediate code description and using a system determined set of the one or more constraints as parameters for the adaptive variables;
   wherein the predefined language supports a function specified in the high level code description of the web page, which is not supported in one or more of the languages in the class of browser languages supported by the runtime compiler, through the use of one or more scripts which may be passed through to the browser-ready code to either implement such function or advise users that such function is unavailable.

2. The process of claim 1 wherein the predefined language is a domain independent intermediate vocabulary format designed to relate the high level code description of the web page in the domain dependent adaptive web language to browser language, in the class of browser languages supported by the runtime compiler.

3. The process of claim 2, wherein the one or more constraints are selected from the group of classes of constraints consisting of: user provided information; browser use history; technical specifications of a system from which the request originates; and technical specifications of a network through which the request is received.

4. The process of claim 3 further comprising a step (f) following step (e) of providing such instance of the browser-ready code in response to the request.

5. The process of claim 3 wherein step (c) further comprises the step of: having the synthesis engine retrieve and store additional input parameters for the adaptive variables.

6. The process of claim 1 wherein the one or more constraints are taken from one or more data sources.

* * * * *